(12) United States Patent
Garyani et al.

(10) Patent No.: US 11,888,870 B2
(45) Date of Patent: Jan. 30, 2024

(54) MULTITENANT SHARING ANOMALY CYBERATTACK CAMPAIGN DETECTION

(71) Applicant: Microsoft Technology Licensing, LLC, Redmond, WA (US)

(72) Inventors: Yaakov Garyani, Raanana (IL); Moshe Israel, Ramat Gan (IL); Hani Hana Neuvirth, Tel Aviv (IL); Ely Abramovitch, Tel Aviv (IL); Amir Keren, Redmond, WA (US); Timothy William Burrell, Cheltenham (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 306 days.

(21) Appl. No.: 17/493,060

(22) Filed: Oct. 4, 2021

(65) Prior Publication Data
US 2023/0107335 A1    Apr. 6, 2023

(51) Int. Cl.
*H04L 9/40* (2022.01)
(52) U.S. Cl.
CPC ...... *H04L 63/1416* (2013.01); *H04L 63/1441* (2013.01)
(58) Field of Classification Search
CPC ............ H04L 63/1416; H04L 63/1441; H04L 63/1425; G06F 21/554
USPC .......................................................... 726/23
See application file for complete search history.

(56) References Cited

U.S. PATENT DOCUMENTS

| 7,607,170 | B2* | 10/2009 | Chesla ............... H04L 63/1408 709/224 |
| 9,521,162 | B1* | 12/2016 | Zand ................... H04L 63/1458 |
| 9,679,131 | B2* | 6/2017 | Striem Amit .......... G06F 21/55 |
| 10,735,498 | B2* | 8/2020 | Yang ................ H04N 21/2668 |
| 2002/0078381 | A1 | 6/2002 | Farley et al. |
| 2010/0205673 | A1 | 8/2010 | Burrell et al. |
| 2011/0191848 | A1 | 8/2011 | Zorn et al. |
| 2013/0283245 | A1 | 10/2013 | Black et al. |
| 2015/0193622 | A1 | 7/2015 | Burrell et al. |

(Continued)

OTHER PUBLICATIONS

"International Search Report and Written Opinion Issued in PCT Application No. PCT/US22/042407", dated Dec. 23, 2022, 9 Pages.

(Continued)

*Primary Examiner* — Teshome Hailu
(74) *Attorney, Agent, or Firm* — Ogilvie Law Firm

(57) ABSTRACT

Embodiments detect cyberattack campaigns against multiple cloud tenants by analyzing activity data to find sharing anomalies. Data that appears benign in a single tenant's activities may indicate an attack when the same or similar data is also found for additional tenants. Attack detection may depend on activity time frames, on how similar certain activities of different tenants are to one another, on how unusual it is for different tenants to share an activity, and on other factors. Sharing anomaly analysis may utilize hypergeometric probabilities or other statistical measures. Detection avoidance attempts using entity randomization are revealed and thwarted. Authorized vendors may be recognized, mooting anomalousness. Although data from multiple tenants is analyzed together for sharing anomalies while monitoring for attacks, tenant confidentiality and privacy are respected through technical and legal mechanisms. Mitigation is performed in response to an attack indication.

20 Claims, 4 Drawing Sheets

---

ATTACK 404 CAMPAIGN 406 DETECTION SYSTEM 402 (FUNCTIONALITY 420)

DATASET SEARCH INTERFACE 414 TO CUSTOMER EVENT 432 DATASET 436 FOR ACTIVITIES 306 DURING TIME PERIOD 418

CAMPAIGN DETECTION SOFTWARE 410 TO IDENTIFY SHARED ACTIVITY 412 SUBSET 304 AND CHECK WHETHER SHARING 422 IS ANOMALOUS 408

CAMPAIGN INDICATOR 424 / FOOTPRINT 426    STORE 434    MITIGATION TOOL 430

PROCESSOR 110    MEMORY 112    INTERFACE 428

(56) References Cited

U.S. PATENT DOCUMENTS

| | | |
|---|---|---|
| 2016/0226901 A1* | 8/2016 | Baikalov ............ H04L 63/1425 |
| 2016/0269424 A1 | 9/2016 | Chandola et al. |
| 2016/0308884 A1* | 10/2016 | Kent ...................... H04L 63/08 |
| 2017/0207980 A1 | 7/2017 | Hudis et al. |
| 2017/0359362 A1 | 12/2017 | Kashi et al. |
| 2018/0063161 A1* | 3/2018 | Kopp ................ H04L 63/1416 |
| 2018/0063188 A1 | 3/2018 | Karin et al. |
| 2018/0084001 A1 | 3/2018 | Hudis et al. |
| 2018/0096157 A1 | 4/2018 | Israel et al. |
| 2018/0176227 A1 | 6/2018 | Israel et al. |
| 2018/0248893 A1 | 8/2018 | Israel et al. |
| 2018/0295149 A1 | 10/2018 | Gazit et al. |
| 2018/0302430 A1 | 10/2018 | Israel et al. |
| 2018/0324193 A1 | 11/2018 | Ronen et al. |
| 2018/0359219 A1 | 12/2018 | Israel et al. |
| 2018/0365412 A1 | 12/2018 | Israel et al. |
| 2018/0367548 A1 | 12/2018 | Stokes, III et al. |
| 2018/0375831 A1 | 12/2018 | Kliger et al. |
| 2019/0005225 A1 | 1/2019 | Patrich et al. |
| 2019/0007415 A1 | 1/2019 | Kliger et al. |
| 2019/0042456 A1 | 2/2019 | Ginzburg et al. |
| 2019/0130099 A1 | 5/2019 | Yom-Tov et al. |
| 2019/0215330 A1 | 7/2019 | Neuvirth et al. |
| 2019/0266325 A1 | 8/2019 | Scherman et al. |
| 2019/0281064 A1 | 9/2019 | Patrich et al. |
| 2019/0286826 A1 | 9/2019 | Bargury et al. |
| 2019/0306178 A1 | 10/2019 | Weizman et al. |
| 2019/0319973 A1 | 10/2019 | Kraemer et al. |
| 2019/0394240 A1 | 12/2019 | Israel et al. |
| 2020/0014697 A1 | 1/2020 | Karin et al. |
| 2020/0044911 A1 | 2/2020 | Kliger et al. |
| 2020/0045018 A1 | 2/2020 | Bargury et al. |
| 2020/0045075 A1 | 2/2020 | Kliger et al. |
| 2020/0053090 A1 | 2/2020 | Kliger et al. |
| 2020/0057953 A1 | 2/2020 | Livny et al. |
| 2020/0067980 A1 | 2/2020 | Livny et al. |
| 2020/0151326 A1 | 5/2020 | Patrich et al. |
| 2020/0162516 A1 | 5/2020 | Israel et al. |
| 2020/0201856 A1 | 6/2020 | Israel et al. |
| 2020/0233961 A1 | 7/2020 | Wolfin et al. |
| 2020/0244640 A1 | 7/2020 | Itzhaki et al. |
| 2020/0252417 A1 | 8/2020 | Neuvirth et al. |
| 2020/0287915 A1 | 9/2020 | Neuvirth et al. |
| 2020/0304524 A1 | 9/2020 | Weinberger et al. |
| 2020/0322359 A1 | 10/2020 | Burns et al. |
| 2020/0336505 A1 | 10/2020 | Neuvirth et al. |
| 2021/0044606 A1 | 2/2021 | Neuvirth et al. |
| 2021/0075794 A1 | 3/2021 | Gazit et al. |
| 2021/0124339 A1 | 4/2021 | Bargury et al. |
| 2021/0218763 A1 | 7/2021 | Bargury et al. |
| 2021/0243208 A1 | 8/2021 | Rubin et al. |

OTHER PUBLICATIONS

Jeff Goldman, "ArcSight vs IBM QRadar: Top SIEM Solutions Compared", retrieved from <<https://www.esecurityplanet.com/products/arcsight-vs-ibm-qradar/>>, Feb. 21, 2018, 5 pages.

"Cloud Service Provider Security Solutions | Huntsman Security", retrieved from <<https://www.huntsmansecurity.com/solutions/cyber-security-solutions/cloud-service-providers/>>, no later than Aug. 20, 2021, 7 pages.

"Highly Evasive Attacker Leverages SolarWinds Supply Chain to Compromise Multiple Global Victims With Sunburst Backdoor", retrieved from <<https://www.fireeye.com/blog/threat-research/2020/12/evasive-attacker-leverages-solarwinds-supply-chain-compromises-with-sunburst-backdoor.html>>, Dec. 13, 2020, 15 pages.

"Hypergeometric distribution", retrieved from <<https://en.wikipedia.org/wiki/Hypergeometric_distribution>>, Jun. 24, 2021, 10 pages.

"IBM QRadar SIEM", retrieved from <<https://www.ibm.com/downloads/cas/RLXJNX2G>>, Feb. 2019, 4 pages.

"Security White Paper", retrieved from <<https://www.midaxo.com/hubfs/Midaxo_Security-Whitepaper_EU.pdf?t=1518041238055>>, Dec. 20, 2017, 15 pages.

Chris Preimesberger, "Splunk vs. IBM QRadar: SIEM Head-to-Head", retrieved from <<https://www.eweek.com/security/splunk-vs-ibm-qradar-siem-head-to-head/>>, Mar. 15, 2021, 6 pages.

"WannaCry ransomware attack", retrieved from <<https://en.wikipedia.org/wiki/WannaCry_ransomware_attack>>, Aug. 24, 2021, 27 pages.

"Azure Sentinel entity types reference", retrieved from <<https://docs.microsoft.com/en-us/azure/sentinel/entities-reference>>, Feb. 10, 2021, 28 pages.

\* cited by examiner

MULTITENANT SHARING ANOMALY CYBERATTACK CAMPAIGN DETECTION

BACKGROUND

Attacks on computing systems take many different forms, including some forms which are difficult to predict, and forms which may vary from one situation to another. Accordingly, one of the guiding principles of cybersecurity is "defense in depth". In practice, defense in depth is often pursed by forcing attackers to encounter multiple different kinds of security mechanisms at multiple different locations around or within a computing system. No single security mechanism is able to detect every kind of cyberattack, or able to end every detected cyberattack. But sometimes combining and layering a sufficient number and variety of defenses will deter an attacker, or at least limit the scope of harm from an attack.

To implement defense in depth, cybersecurity professionals consider the different kinds of attacks that could be made. They select defenses based on criteria such as: which attacks are most likely to occur, which attacks are most likely to succeed, which attacks are most harmful if successful, which defenses are in place, which defenses could be put in place, and the costs and procedural changes and training involved in putting a particular defense in place. Some defenses might not be feasible or cost-effective in a given environment. However, improvements in cybersecurity remain possible, and worth pursuing.

SUMMARY

Some embodiments taught herein detect cyberattack campaigns against multiple cloud tenants by analyzing activity data, e.g., to determine whether sharing anomalies are present. An embodiment may detect an attack that tenant-localized detection tools missed, or reinforce suspicions raised by a tenant-localized detection tool. Data that appears benign in the context of a single tenant's activity may indicate an attack when the same or similar data is found in the activity data of additional tenants.

Detection results may depend on a time frame in which the activities occurred, on how similar the activities are to one another, on how unusual it is for different tenants to share a particular activity, and on other factors discussed herein.

In response to indications of an attack, mitigation may be performed to heighten resource access requirements, increase logging and auditing, suspend account access, and so on.

Other technical activities and characteristics pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims as properly understood, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
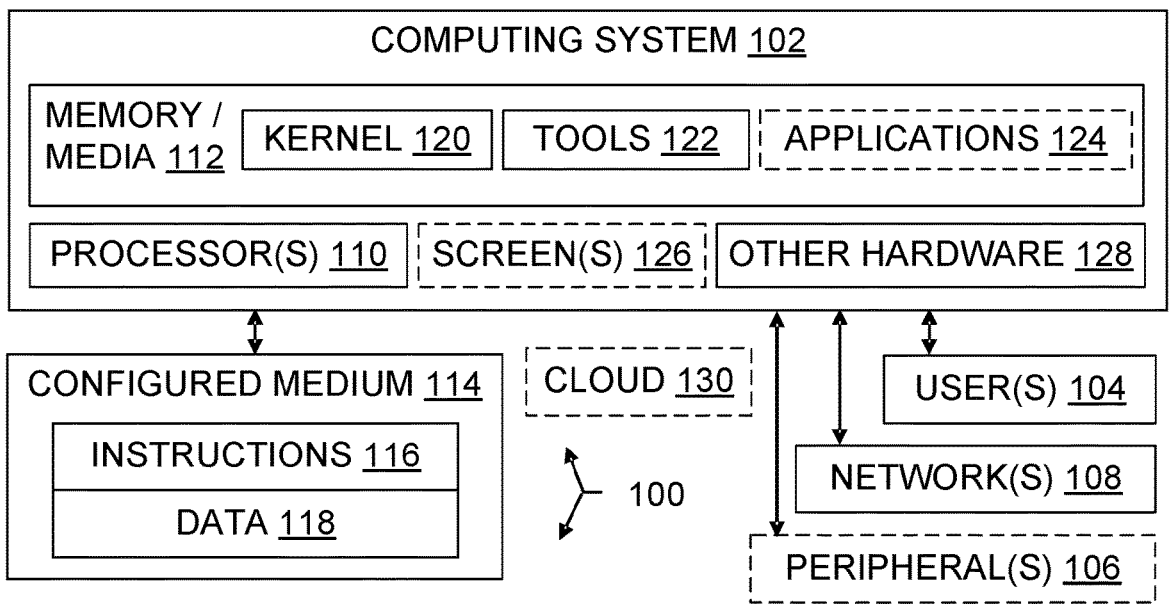
FIG. 1 is a block diagram illustrating computer systems generally and also illustrating configured storage media generally.

Innovations may expand beyond their origins, but understanding an innovation's origins can help one more fully appreciate the innovation. In the present case, some teachings described herein were motivated by insights gained by Microsoft innovators who were working to improve Azure® cloud security against malware campaigns (mark of Microsoft Corporation).

The innovators noted that some malware campaigns attempt to spread malware, and to also benefit from that malware, in a short time frame, e.g., less than a day, and even within an hour or two. This manner of rapid attack is made in the hope that the malware will execute its operations against at least some of the targeted systems before the malware is discovered and countermeasures are taken against the attack.

One of the technical challenges faced by malware targets is therefore how to detect a rapid attack fast enough to reduce or perhaps even avoid significant damage from the attack. The innovators noted that Microsoft and other cloud service providers who service multiple customers may be authorized to access data beyond the data that is available to any particular single customer of the service provider. Cloud service providers have a cloud-wide view which extends beyond the perspective of any given single cloud tenant. The innovators considered whether the service provider's access to additional data could support improved detection of malware campaigns.

But they also recognized that simply having more data is not itself a defense. Simply saying "get more data" does not answer questions such as what specific data to use for attack detection, and how exactly to use it. Some kind of data selection criterion is implicated to focus detection efforts. The sheer volume of a cloud's activity data for a single day may be in the megabytes, if not more, even for a small cloud with as few as two customers having as few as ten users each. Mental or paper-and-pen approaches are insufficiently fast to perform the computations involved in protecting even a small cloud against even a relatively slow malware campaign. Thus, an emergent technical challenge is how to automatically and effectively select and use data from multiple customers to improve detection of malware campaigns or other cybersecurity attacks.

Some embodiments herein address these and other technical challenges by automatically analyzing customer activity data based on one or more of the following factors: (a) whether activity data ascribed to different customers is similar, and the extent of any such similarity, (b) the time frame in which the similar activities occurred, and (c) the likelihood of such similarities in activities that are ascribed to different customers. This is referred to herein as a "multitenant", "multi-customer", "shared activity", or "cloud view" approach, as opposed to the localized approach noted below. The multitenant shared activity analysis may determine that certain activity data shared by tenants indicates an attack, and then attack countermeasures may be taken by the customers or the service provider or both.

As a clarification, discussion herein often refers to activity in a cloud or other network being "ascribed" to a particular customer rather than being "performed by" that customer. The "ascribed" terminology recognizes that activity nominally performed by the customer may actually have been caused by malware or by other unauthorized actors. Activity is nominally performed by a customer when it was performed in one of the customer's accounts, or was performed using a security token or password issued to one of the customer's users, for example.

Also, "customer" is used interchangeably herein with "tenant" to indicate a business, agency, institution, or other organization or legal person which has a contractual relationship with the service provider. Typically, the customer will have multiple employees, students, or other individuals who receive accounts from the service provider based on the service provider's service contract with the customer; these are referred to generally as "users". However, individuals may also be customers of some service providers.

Advantages of the multitenant shared activity approach to cyberattack detection may be better understood by considering other approaches. One detection approach that differs from the multitenant shared activity approach is an approach that relies on data from only a single customer. This kind of approach is referred to herein as a "customer-localized", "tenant-localized", or "localized" approach to attack detection. In some circumstances, an attack will be detected by either approach—localized or multitenant. But in other cases, the multitenant shared activity approach may detect an attack that is not detected by a localized approach.

For example, a creation of an account with a username "DVader" may well go unnoticed among dozens or hundreds of other user account creations ascribed to a particular customer. In general, the "DVader" account creation probably would not automatically cause an alert from a tenant-localized intrusion detection system. But the creation of "DVader" accounts for each of six different customers within the space of an hour may be unusual enough for a multitenant analysis to automatically characterize that set of account creations as suspicious. The characterization may then cause an embodiment to automatically trigger attack countermeasures.

However, not all shared activity is suspicious. In a cloud with dozens of customers, with each customer having dozens or hundreds of users, the creation for two different customers within a given hour of respective accounts that have the same username may be a common occurrence, and thus may not be deemed suspicious, even if both usernames are something unusual or even ominous such as "DVader". Also, the creation for six different customers within a given hour of respective accounts that have the same username may be a common occurrence for certain usernames other than "DVader", e.g., frequently used names such as "Alex" or "Maria". Also, the creation for six different customers within a given longer period such as six months of respective accounts that have the same username may be a common occurrence even for a coined username such as "DVader".

In addition, a pattern may be shared by a set of usernames even when no individual name is repeated within the set. For instance, the creation 1014 within a given two-hour period of accounts for usernames "Alexaaaaa", "Alexaaaab", "Alexaacav", and "Alexbbmxa" accounts for respective customers may be unusual enough to be automatically deemed suspicious.

In some embodiments, unlikely sharing in multiple customer's activity data is treated as an attack indicator unless there is an overriding indication otherwise. For instance, suppose it is very unlikely that all of a cloud's customers would download software from the same domain within a ninety-minute period. Taken on its own, that shared activity is suspicious. But if that software is signed by a reputable vendor whose security has not been breached, and if the software is downloaded by all the customers from a domain owned by that vendor, then the shared download activity would not be an attack indicator.

These examples help illustrate advantages of the teachings provided herein. Rather than merely aggregating events from multiple tenants, some embodiments analyze activity data to determine whether sharing anomalies are present. The sharing anomaly analysis may be based on historic data, and may be performed using parsing, regular expression and other pattern matching, machine learning, and other computational tools and techniques which are adapted for use in assessing the likelihood that selected activity data for a particular activity period would be shared among multiple customers of a service provider.

One of skill informed by the present disclosure will recognize that the values in these examples (e.g., two different customers, six different customers, one hour, six months, various usernames) are merely illustrative. Other values will be associated with suspect shared activity or with non-suspect shared activity in other situations and in various embodiments.

The foregoing examples and scenarios are not comprehensive. Other scenarios, technical challenges, and innovations will be apparent to one of skill upon reading the full disclosure herein.

Operating Environments

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud. An individual machine is a computer system, and a network or other group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A screen 126 may be a removable peripheral 106 or may be an integral part of the system 102. A user interface may support interaction between an embodiment and one or more human users. A user interface may include a command line interface, a graphical user interface (GUI), natural user interface (NUI), voice command interface, and/or other user interface (UI) presentations, which may be presented as distinct options or may be integrated.

System administrators, network administrators, cloud administrators, security analysts and other security personnel, operations personnel, developers, testers, engineers, auditors, and end-users are each a particular type of user 104. Automated agents, scripts, playback software, devices, and the like acting on behalf of one or more people may also be users 104, e.g., to facilitate testing a system 102. Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a network 108 via network interface equipment, for example.

Each computer system 102 includes at least one processor 110. The computer system 102, like other suitable systems, also includes one or more computer-readable storage media 112, also referred to as computer-readable storage devices 112. Storage media 112 may be of different physical types. The storage media 112 may be volatile memory, nonvolatile memory, fixed in place media, removable media, magnetic media, optical media, solid-state media, and/or of other types of physical durable storage media (as opposed to merely a propagated signal or mere energy). In particular, a configured storage medium 114 such as a portable (i.e., external) hard drive, CD, DVD, memory stick, or other removable nonvolatile memory medium may become functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage device 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, TPUs and/or GPUs), memory/storage media 112, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments, peripherals 106 such as human user I/O devices (screen, keyboard, mouse, tablet, microphone, speaker, motion sensor, etc.) will be present in operable communication with one or more processors 110 and memory.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which may be present in a given computer system. Virtualizations of networking interface equipment and other network components such as switches or routers or firewalls may also be present, e.g., in a software-defined network or a sandboxed or other secure cloud computing environment. In some embodiments, one or more computers are partially or fully "air gapped" by reason of being disconnected or only intermittently connected to another networked device or remote cloud. In particular, functionality for multitenant sharing analysis for attack detection enhancements taught herein could be installed on an air gapped network such as a highly secure cloud or highly secure on-premises network, and then be updated periodically or on occasion using removable media. A given embodiment may also communicate technical data and/or technical instructions through direct memory access, removable nonvolatile storage media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that any items not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

More About Systems

Figure 2:
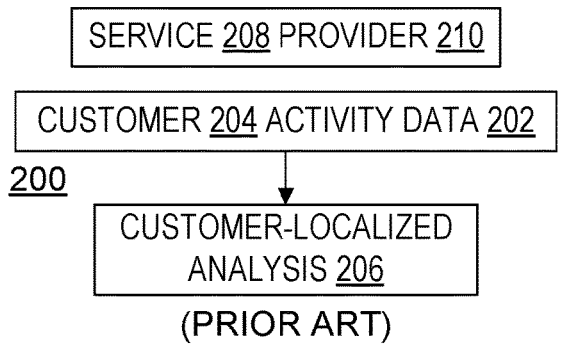
FIG. 2 is a data flow diagram illustrating aspects of a conventional customer-localized attack detection architecture.

FIG. 2 illustrates a customer-localized attack detection architecture 200. A service provider 210 provides services 208 to multiple customers 204, e.g., accounts in a cloud 130. Activity data 202 of a particular customer 204 is submitted to a customer-localized analysis 206 for attack detection. The customer 204 is a tenant or other customer of the cloud 130 or another network 108. The illustrated version of a customer-localized analysis 206 uses activity data 202 only from the particular customer 204 as a basis for detecting a cyberattack. Accordingly, this is not a multitenant sharing anomaly analysis.

Another kind of analysis (not shown) may receive data 202 from more than one customer, but does not rely on the likelihood that certain activity data is shared by multiple customers 204 as a basis for attack detection. For instance, an interruption of electric power or a physical attack against cloud servers or against communication lines could impact multiple customers, irrespective of whether they share an activity such as creating similarly named accounts at nearly the same time. Hence, detection of power interruption, communication line breakage, or server hardware incapacitation, is not a multitenant sharing anomaly analysis for attack detection.

Figure 3:
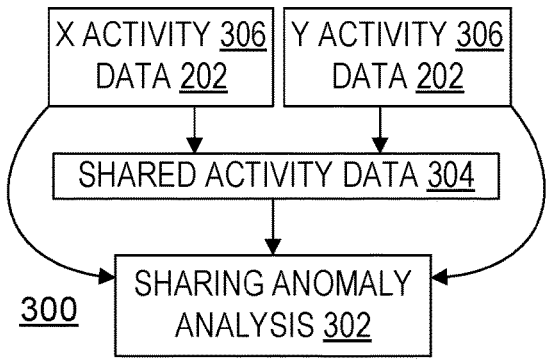
FIG. 3 is a data flow diagram illustrating aspects of a multitenant attack detection architecture taught herein.

FIG. 3 contrasts with FIG. 2. In the FIG. 3 architecture 300, activity data 202 ascribed to a customer X and activity data 202 ascribed to a customer Y flows into a multitenant attack detection sharing anomaly analysis 302. Some of the activity data 202 from X (but normally not all of it) overlaps or is otherwise similar to some of the activity data 202 from Y; this is shown in FIG. 3 as shared activity data 304.

Data 304 may be shared, for instance, because it represents the same kind of event, e.g., account creation, or because it includes the same entity data, e.g., the same username or the same IP address or the same process name. In some situations, and with some embodiments, the entity data need not be exactly the same to be shared. Two pieces of data 202 may instead be computationally recognized as similar and hence as shared data 304, by reason of both data matching a pattern such as a regular expression, an IP subnet mask, or context-free grammar.

Figure 4:
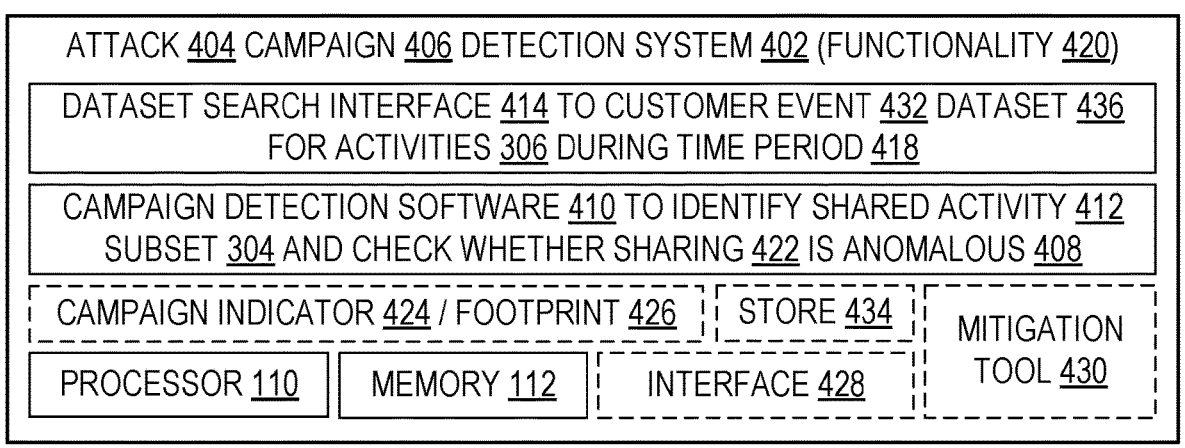
FIG. 4 is a block diagram illustrating an attack campaign detection system.

FIG. 4 shows some aspects of an enhanced system 402. The system 402 is a system 102 that is enhanced with innovative functionality 420 that performs cyberattack 404 campaign 406 detection based at least in part on a multitenant sharing anomaly 408.

For example, the illustrated system 402 includes a dataset search interface 414 through which the software 410 obtains or searches (or both) customer activity data 202 of a customer's dataset 436. The activity data 202 may be stored in logs, packet streams, or other data storage artifacts 434 which are collectively referred to herein as a "store" 434. In operation, the dataset search interface 414 may focus on particular customers 204, on particular activities 306 (as represented by e.g., account creation events 432), on a particular time period 418, or on a combination thereof.

The illustrated system 402 also includes a processor 110 configured by campaign detection software 410. In operation, the software 410 identifies shared activity 412 in the form of the shared activity subset 304 of activity data 202 of two or more customers 204 of a service provider 210. The software 410 also checks whether the sharing 422 represented by the shared activity subset 304 is anomalous 408. The presence of a multitenant sharing anomaly 408 may be treated by the system 402 as an indicator 424 of an attack campaign 406. This may occur even when the footprint 426 of the attack campaign 406 has evaded detection by one or more customer-localized detection tools.

Upon detecting a campaign 406, the illustrated system may communicate through one or more interfaces 428 with one or more attack mitigation tools 430, in efforts to reduce the scope or severity of damage from the detected attack campaign 406.

Figure 5:
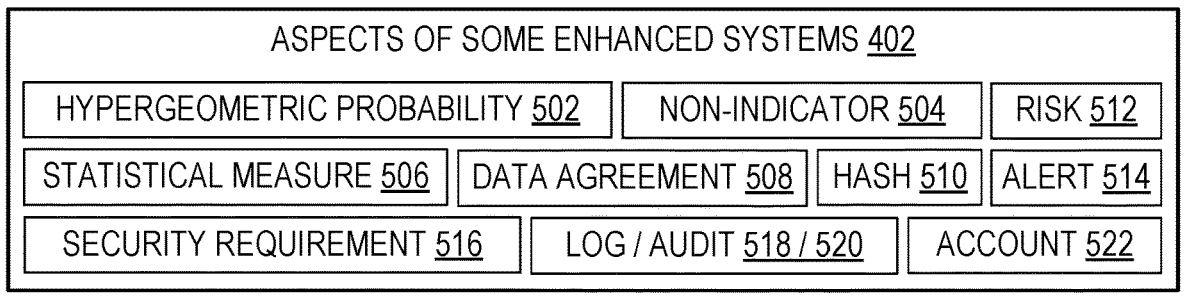
FIG. 5 is a block diagram illustrating some additional aspects of some attack campaign detection systems.

FIG. 5 shows some aspects of some enhanced systems 402. This is not meant to be a comprehensive list. These items and other items relevant to functionality 420 generally, including aspects of some enhanced systems 402, are discussed at various points herein, and additional details regarding them are provided in the discussion of a List of Reference Numerals later in this disclosure document.

Figure 6:
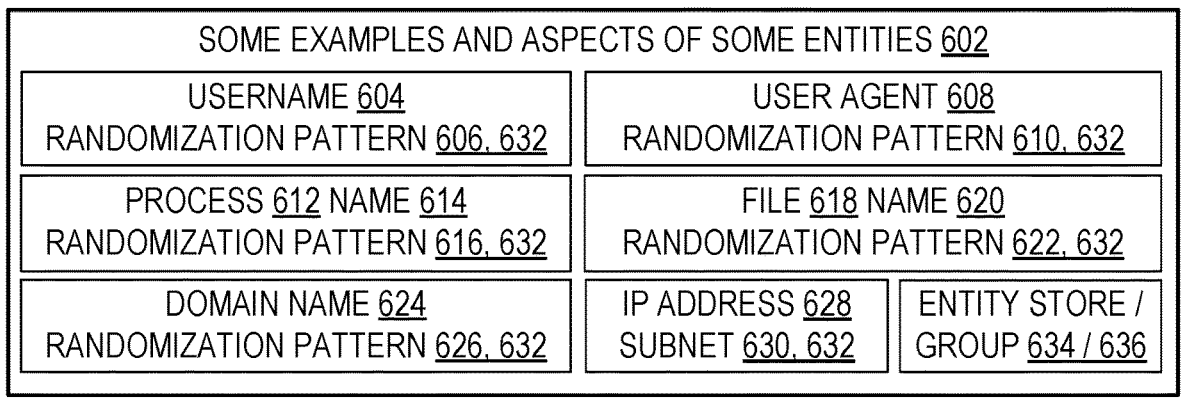
FIG. 6 is a block diagram illustrating some examples and aspects of some entities in activity data.

FIG. 6 shows some examples and aspects of some entities 602 which may appear in activity data 202. This is not meant to be a comprehensive list. These items and other items relevant to functionality 420 generally, including aspects of activity data 202 such as events 432 and entities 602, are discussed at various points herein, and additional details regarding them are provided in the discussion of a List of Reference Numerals later in this disclosure document.

Figure 7:
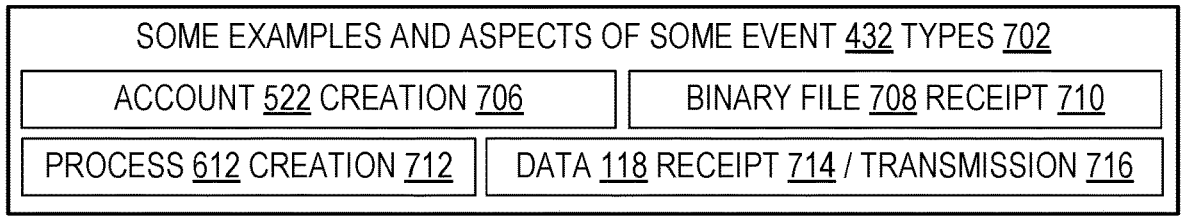
FIG. 7 is a block diagram illustrating some examples and aspects of some event types in activity data.

FIG. 7 shows some examples and aspects of some event types 702 which may appear in activity data 202. This is not meant to be a comprehensive list. These items and other items relevant to functionality 420 generally, including aspects of activity data 202 such as events 432, are discussed at various points herein, and additional details regarding them are provided in the discussion of a List of Reference Numerals later in this disclosure document.

Figure 8:
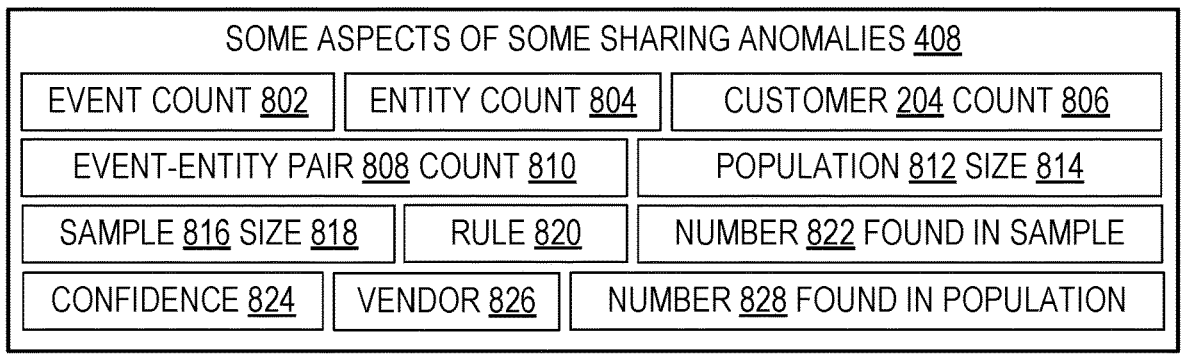
FIG. 8 is a block diagram illustrating some aspects of some sharing anomalies in activity data.

FIG. 8 shows some examples and aspects of some activity data 202 sharing anomalies 408. This is not meant to be a comprehensive list. These items and other items relevant to functionality 420 generally, including aspects of activity data 202 and anomaly 408 definition and identification, are discussed at various points herein, and additional details regarding them are provided in the discussion of a List of Reference Numerals later in this disclosure document.

In some embodiments, an enhanced system 402 searches events 432 of a first customer 204 and events 432 of a second customer 204 for one or more time periods 418 of interest. The time periods 418 can be different for different customers, e.g., midnight to 2 am for customer A and 1 am to 2 am for customer B. The time periods 418 could also be the same for both customers.

This example only mentions two customers A and B, for simplicity and to ease naming of customers. But it is contemplated that many embodiments will be equipped and configured to search events 432 of two or more customers, and that some sharing anomalies 408 will be detected in the form of suspect shared activity of three, four, five, or more customers in particular situations.

In this example, the search of events 432 tries to identify an activity 412 shared by both customers. The shared activity may be represented by events 394, 432 that match each other 1-to-1. However, other possibilities are also detected in some embodiments, e.g., matching events that represent a shared activity 412 may have a username of foobar1 for customer A and foobar2 for customer B, for example, or matching events may have respective IP addresses that are identical in only their first 28 bits.

After identifying shared activity 412, the enhanced system 402 determines whether the sharing of the shared activity is anomalous 408. Whether the sharing of an activity by multiple customers 204 is anomalous is a different question than whether the shared activity is anomalous within the context of only customer A events. It may occur, for instance, that creation of a process named "pozvond" is not considered unusual by any localized security tool of customer A, whereas the creation of "pozvond" processes (apparently) by both A and B within thirty minutes of one another is unusual, because "pozvond" is not on a list of names of processes that A and B have both created within an hour of each other anytime in the past six months.

Whether the sharing of an activity by multiple customers 204 is anomalous is also a different question than whether the shared activity is anomalous within a set of events created by pooling events of customer A and customer B but ignoring which customer a given event came from. For example, the process name "pozvond" may be no more unusual than hundreds of other names of processes apparently created by A or by B within the past twenty-four hours.

One focus of a shared activity anomalousness determination is instead on whether it's unusual for two different customers to have the same (or similar) events when those events have particular values (e.g., particular or similar usernames, IP addresses, process names, etc.). For example, it's not unusual for two customers to both have many processes named "init", even within a short time period such as an hour, because "init" is the name of a root process on every Linux® system (mark of Linus Torvalds). But it would be unusual for two customers to both have a process named "pwn", or for them both to have a process named "pozvond", for example.

If the sharing is anomalous, this enhanced system 402 treats the anomaly as an attack indicator 424. If the sharing is not anomalous, the sharing could be part of an attack or it could be benign—the system 402 does not know, unless other tools are used to determine whether an attack is underway.

Some embodiments use or provide a functionality-enhanced system, such as system 402 or another system 102 that is enhanced as taught herein. In some embodiments, an enhanced system which is equipped for detecting a cybersecurity attack campaign against multiple customers of a service provider includes a digital memory 112 and a processor 110 in operable communication with the memory. This system 402 also includes a datasets search interface 414 connectable to a first customer events dataset 436 and to a second customer events dataset 436, the first customer events dataset representing activities 306 within a first time period 418 that are ascribed 1004 to a first customer 204, the second customer events dataset representing activities 306 within a second time period 418 that are ascribed 1004 to a second customer 204. Some embodiments omit the time period limitations.

In this example, the processor 110 is configured to enhance cybersecurity by performing cybersecurity attack campaign 406 detection steps which include (a) identifying via at least the datasets search interface 414 a shared activity subset 304 of the datasets which represents a shared activity 412, the shared activity being an activity that is ascribed to each of the customers, (b) determining whether customers' sharing 422 of the shared activity is anomalous, (c) characterizing the shared activity as an indicator 424 of a campaign attack when the sharing is anomalous, and (d) characterizing the shared activity as a non-indicator 504 when the sharing is not anomalous. In this manner, operation of the computing system 402 reduces a security risk 512 of overlooking an attack campaign whose footprint 426 appears benign within any single customer's dataset.

Some embodiments, further communicate with or include an attack mitigation tool 430, and characterizing the shared activity as an indicator 424 of a campaign attack triggers a mitigation operation 914 by the attack mitigation tool 430. Mitigation operations can include one or more of alerting administrative personnel or security personnel or both, enhancing security requirements (by requiring multifactor authentication, requiring human review of access requests, etc.), increasing logging or auditing or both, suspending an account, or invoking additional mitigation tool(s), for example.

Some embodiments use a hypergeometric probability to check for anomalous sharing. Thus, in some embodiments the computing system 402 resides in an environment 100 having M customer events datasets 436 which represent activities 306 ascribed to M respective customers 204, and the shared activity 412 is an activity that is ascribed to exactly N of the M customers, where N is an integer greater than one, and M is greater than or equal to N. The system's processor is configured to calculate a hypergeometric probability 502 based on at least N and M, and the processor is also configured to determine whether sharing 422 of the shared activity is anomalous 408 based at least in part on the calculated hypergeometric probability.

One of skill will acknowledge that a hypergeometric distribution is a discrete probability distribution that describes the probability 502 of k successes in n draws, without replacement, from a finite population of size N that contains exactly K objects with a specified feature F, each draw being random, and each draw considered a success when the item drawn has the specified feature F and otherwise considered a failure.

Software libraries designed for calculating 1006 hypergeometric probability in R, Python, C, and other programming language environments may be utilized according to the teachings provided herein for multitenant sharing anomaly detection. The specified feature F defining a successful draw corresponds to shared activity data 304, e.g., creation (apparently) by multiple tenants of respective processes or respective accounts having the same name, within a specified time period.

In some embodiments, a hypergeometric distribution yielding probability 502 is based on four parameters: (1) the total number of environments (e.g., computers; "population size" in statistical terminology), (2) the total number of environments that have the event (e.g., new-user-created; "sample size"), (3) the number of environments having the entity (e.g., specific username DVader; "number of successes in the population"), and (4) the number of environments that have paired the event and the entity (e.g., DVader in the new-user-created events; "number of successes in the sample").

More generally, some embodiments use a statistical check 506 for anomalous sharing between customers 204. This includes using hypergeometric probability 502 but also includes other statistical checks 506, e.g., Z-score, interquartile range, unsupervised anomaly detection, time series data anomaly detection, and machine learning (considered a statistical mechanism herein). Software libraries designed for calculating statistical measures 506 in R, Python, C, and other programming language environments may be utilized according to the teachings provided herein for multitenant sharing anomaly detection.

Thus, in some embodiments the computing system 402 resides in an environment 100 having M customer events datasets 436 which represent activities 306 ascribed 1004 to M respective customers 204, and the shared activity 412 is an activity that is ascribed to exactly N of the M customers, where N is an integer greater than one, and M is greater than or equal to N. The system's processor is configured to calculate 1012 a statistical measure 506 based on at least N and M, and the processor is also configured to determine whether sharing 422 of the shared activity is anomalous 408 based at least in part on the calculated statistical measure.

Some embodiments catch attack indicators 424 which are missed by localized tools 122 that look at only one customer's activity. That is, the attack campaign's footprint 426 is present in the activity data 202 of the particular customer 204, but a localized intrusion detection tool 122 (or other localized security tool 122, or both) fails to treat the footprint 426 as an attack indication 424.

For example, in some embodiments the computing system 402 resides in an environment 100 having at least one customer-localized cybersecurity attack detection tool 122 configured to perform an analysis 206 which is exposed to a particular customer's portion of the shared activity subset 304 of the datasets that represents the shared activity. The customer-localized cybersecurity attack detection tool 122 is customer-localized in that the tool 122 does not have access to more than one customer events dataset 436. The customer-localized cybersecurity attack detection tool 122 treats the shared activity subset portion as normal activity that is not indicative of an attack 404. However, the computing system 402 determines that sharing of the shared activity is anomalous 408, and characterizes the shared activity as an indicator 424 of a campaign attack.

Other system embodiments are also described herein, either directly or derivable as system versions of described processes or configured media, duly informed by the extensive discussion herein of computing hardware.

Although specific system 402 operation, data, and hardware examples are discussed and shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided in this disclosure to help illustrate aspects of the technology, but the examples given within this document do not describe all of the possible embodiments. A given embodiment may include additional or different activity data interfaces or source or events, shared activity definitions or examples, anomaly detection criteria or techniques or tools, time periods, technical features, mechanisms, operational sequences, data structures, or other functionalities for instance, and may otherwise depart from the examples provided herein.

Processes (a.k.a. Methods)

Figure 9:
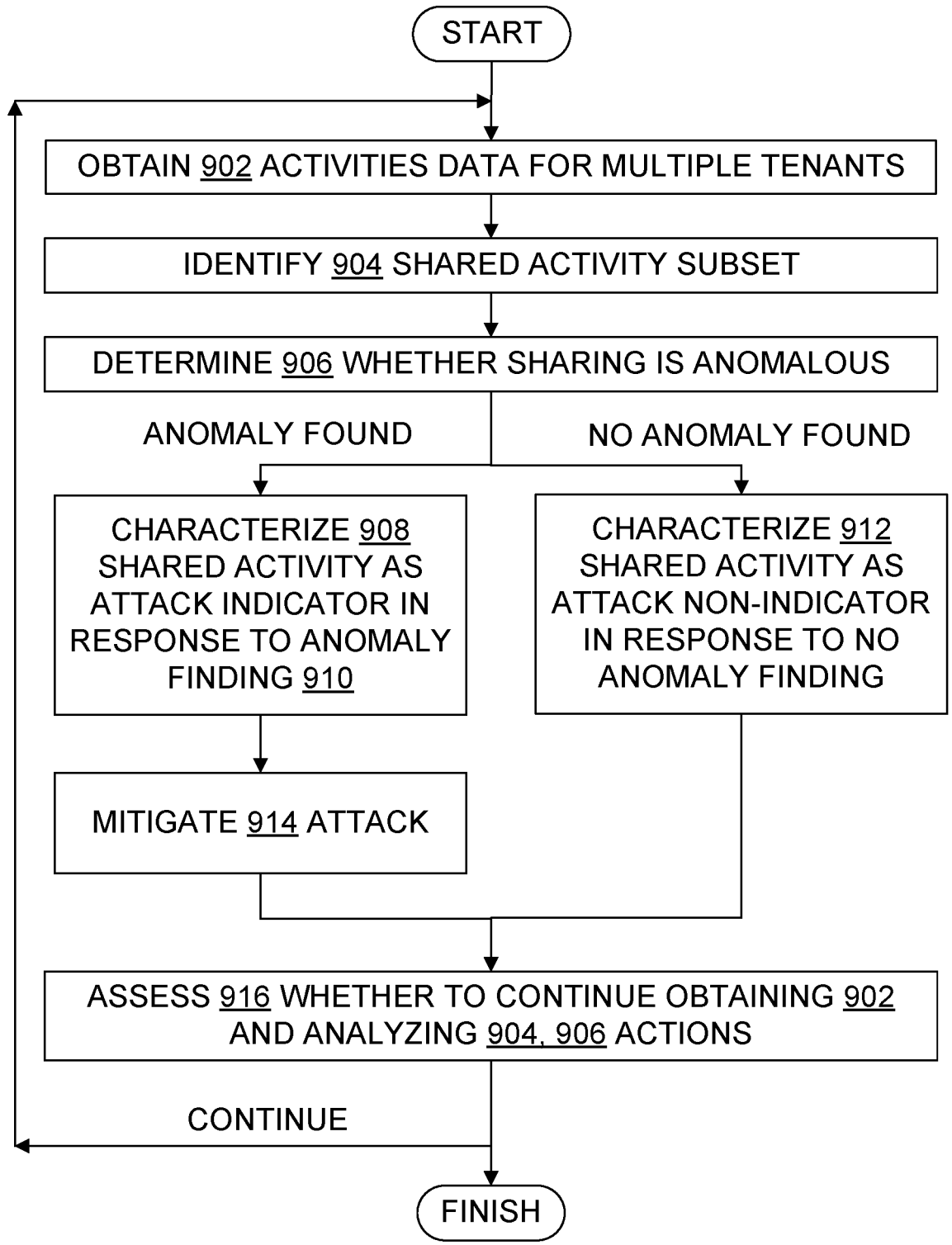
FIG. 9 is a flowchart illustrating steps in some attack campaign detection methods.
Figure 10:
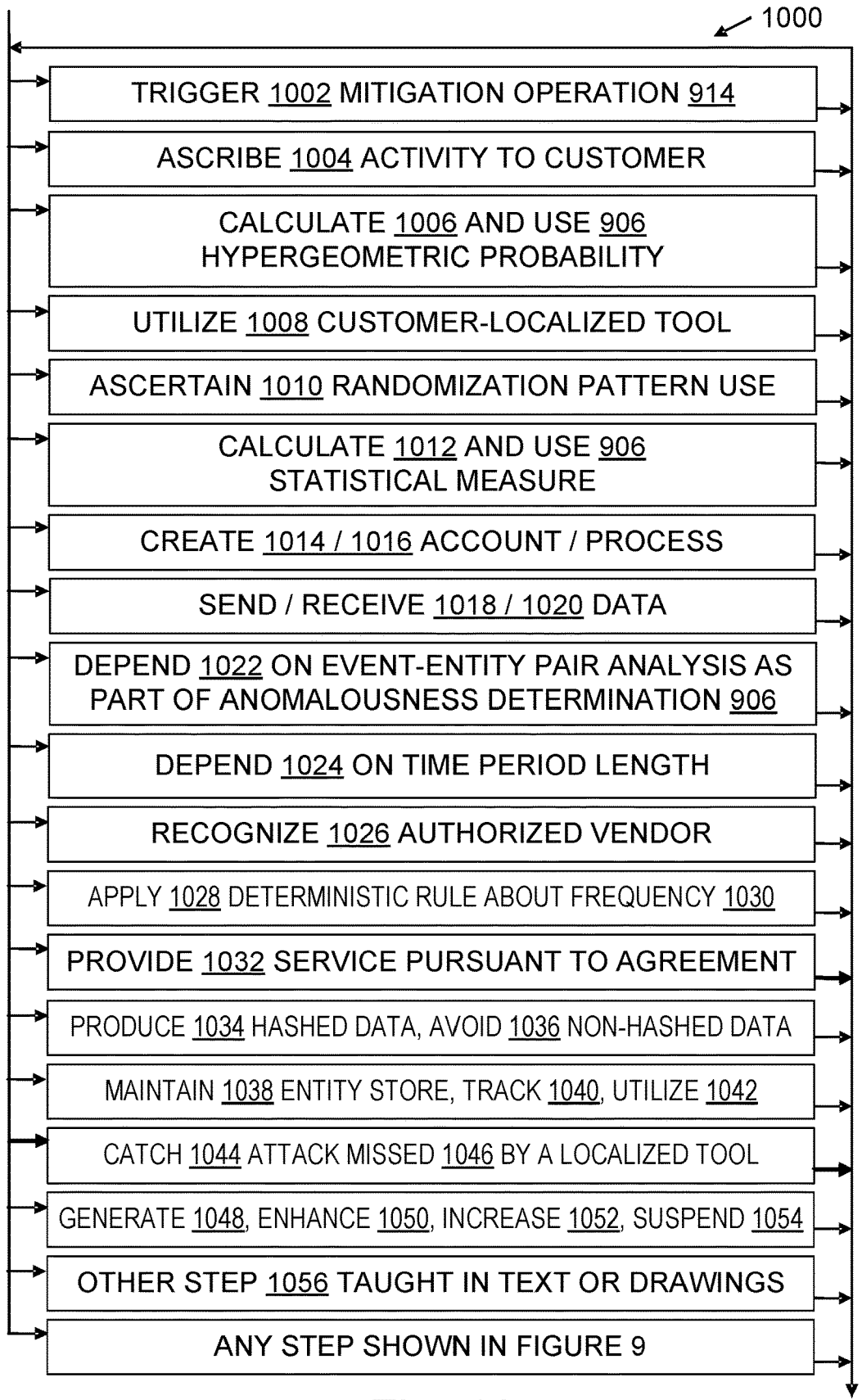
FIG. 10 is a flowchart further illustrating steps in some attack campaign detection methods.

FIGS. 9 and 10 illustrate process families 900, 1000 that may be performed or assisted by an enhanced system, such as system 402 or another multitenant sharing anomaly detection functionality enhanced system as taught herein. Such processes may also be referred to as "methods" in the legal sense of that word.

Technical processes shown in the Figures or otherwise disclosed will be performed automatically, e.g., by an enhanced system 402, unless otherwise indicated. Some related processes may also be performed in part automatically and in part manually to the extent action by a human person is implicated, e.g., a human user 104 may select a time period 418, but no process contemplated as innovative herein is entirely manual.

In a given embodiment zero or more illustrated steps of a process may be repeated, perhaps with different parameters or data to operate on. Steps in an embodiment may also be done in a different order than the top-to-bottom order that is laid out in FIGS. 9 and 10. Steps may be performed serially, in a partially overlapping manner, or fully in parallel. In particular, the order in which action items of FIGS. 9 and 10 are traversed to indicate the steps performed during a process may vary from one performance of the process to another performance of the process. Steps may also be omitted, combined, renamed, or regrouped, be performed on one or more machines, or otherwise depart from the illustrated flow, provided that the process performed is operable and conforms to at least one claim.

Some embodiments use or provide a cybersecurity method, including the following automatic steps: electronically obtaining 902 digital data 202 that represents activities 306 ascribed collectively to at least two customers 204 of a service provider 210; computationally identifying 904, within the obtained data 202, a shared activity subset 304 which represents a shared activity 412, the shared activity being an activity that is ascribed to N of the customers, where N is an integer greater than one; computationally determining 906 that sharing 422 of the shared activity 412 among the customers 204 is anomalous 408; and treating 908 the shared activity subset 304 as an indicator 424 of a cybersecurity attack campaign 406.

Unless constraints on activity data usage are present, any available activity data 202 is potentially part of a shared activity subset 304 that represents an activity that is ascribed to more than one customer.

However, some embodiments constrain which activity data 202 is allowed to represent potentially shared activity, e.g., by constraining the sharing identification 904 to particular kinds of entities 602. It is contemplated that some kinds of entity 602 will more likely be both present and shared across customers in an attack campaign than other kinds of entity 602. Although some entities may be treated by an embodiment as more interesting than other entities, the entities of most interest are not necessarily also ranked among themselves.

Thus, some embodiments focus the shared activity identification 904 or the anomalousness determination 906, or both, on one or more of the following kinds of entity: username 604, user agent 608, process name 614, file name 620, domain name 624, or IP address 628. This focus increases computational efficiency by reducing or avoiding the spending of computational resources on entities 602 deemed less relevant to multitenant sharing anomaly analysis.

Some embodiments consider an entity 602 shared only when the entity is identical in value for each customer. For example, a creation of a process named "xmmm1dmm" is not considered a shared activity with a creation of a process named "xmmm2dmm" when entity value identicality is a sharing criterion.

However, some embodiments perform sharing identification 904 based on a logical union of identicality and adherence to a randomization pattern 632. For instance, "foobar000" and "foobar001" are different names but they both adhere to the same randomization pattern 632 because they are each formed by appending an incremented numeric counter value to a root name. Similarly, "xmmm1dmm" and "xmmm2dmm" both adhere to a randomization pattern 632 that can be defined by a regular expression such as "xmmm.dmm" or "xmmm[0-9]dmm".

Entities 602 that adhere to a given randomization pattern 632 need not conform with any particular random distribution. The "randomization" part of the term "randomization pattern" used herein is a recognition that threat actors may try to randomize entities to postpone or escape attack detection. But such attempts do not necessarily result in an actually random distribution.

Randomization patterns 632 may be categorized in various ways. One categorization is according to implementation mechanisms. In a particular embodiment, recognition by one or more randomization patterns may be implemented using mechanisms such as regular expression recognizers, IP subnet masks, context-free grammar parsers, and unsupervised machine learning.

Randomization patterns 632 may also or alternately be categorized according to the type 702 of events 432 they recognize. For example, a username randomization pattern 606, 632 recognizes usernames 604, and may be based for example on lexical analysis of account creation events or login attempt events. In contrast, an IP address randomization pattern 630, 632 recognizes IP addresses 628, based for example on upload events 432 or download events 432. A given IP address or set of IP addresses may be used by a campaign 406 for a command and control, for instance.

In some embodiments, the shared activity 412 includes entities 602 conforming with at least one of the following for each of the N customers: a particular username 604, a particular username randomization pattern 606, a particular user agent 608, a particular user agent randomization pattern 610, a particular IP address 628, a particular IP address subnet 630, a particular domain name 624, a particular domain name randomization pattern 626, a particular process name 614, a particular process name randomization pattern 616, a particular file name 620, or a particular file name randomization pattern 622.

For instance, the following events might be identified 904 as representing a shared activity:
Customer A create admin account with username "DVader", download file name "innosent359" from IP address 10.255.255.99;
Customer B create admin account with username "DVader", download file name "innosent359" from IP address 10.255.255.96;
Customer F create admin account with username "DVader", download file name "innosent359" from IP address 10.255.255.98.

In this particular example, shared activity identification 904 may have first recognized the presence of an account creation event with the same username in three customers, among dozens or even hundreds of customers. Further analysis of activity data of those three customers A, B, and F may have then led to recognition of file downloads having the same file name. The download source IP addresses are not identical, but they all fit within the same subnet 10.255.255.x. Alternately, the shared activity identification 904 may have recognized the uses of an identical file name first, and then recognized the identical username usage by the different customers.

The foregoing hypothetical with customers A, B, and F is merely one example. One of skill will acknowledge that many other examples of shared activity identification 904 using other events and other event entities also conform with the teachings presented herein.

In addition to, or instead of, constraining the sharing identification 904 to particular kinds of entities 602, some embodiments constrain shared activity identification 904 to particular event types 702. It is contemplated that some event types 702 will more likely be both present and shared across customers in an attack campaign than other kinds of event types 702.

In particular, some embodiments focus the shared activity identification 904 or the anomalousness determination 906, or both, on one or more of the following event types 702: creation 706 of an account 522, receipt 710 of a binary file 708, 618, creation 712 of a process 612, receipt 714 of data 118 from an IP address 628 or a domain 624, or transmission 716 of data 118 to an IP address 628 or a domain 624. This focus increases computational efficiency by reducing or avoiding the spending of computational resources on event types 702 that are deemed less relevant to multitenant sharing anomaly analysis.

Moreover, some embodiments focus the shared activity identification 904 or the anomalousness determination 906, or both, on one or more of the following event-entity pairs 808: creation 706 of an account 522 for a particular username 604, receipt 710 of a binary file 708, 618 of a particular name 620, creation 712 of a process 612 having a particular process name 614, receipt 714 of data 118 from a particular IP address 628 or a particular domain 624, receipt 714 of data 118 from a particular domain 624, transmission 716 of data 118 to a particular IP address 628, or transmission 716 of data 118 to a particular domain 624.

In a variation, identicality of the particular entity (username, file name, domain name, IP address) is allowed but is not required for sharing to be found, so long as the corresponding entities of different customers adhere to a particular randomization pattern 632. Either way, such a focus increases computational efficiency by reducing or avoiding the spending of computational resources on pairs of event types 702 and entities 602 that are deemed less relevant to multitenant sharing anomaly analysis.

Some embodiments reduce the noise in data being analyzed by the attack detection procedure, e.g., to control for the probability of observing a common (i.e., shared) entity across customers. For example, some embodiments take into account the number of customers for which the event was observed, the number of customers for which the common entity was observed in the event, the number of customers that had this entity in their logs in the past, and the total number of customers for which the system 402 has activity data.

In some embodiments, shared activity data 304 includes at least one event-entity pair 808, with the event-entity pair including an instance of an event type 702 and also including a particular entity 602, and determining 906 whether sharing of the shared activity among the customers is anomalous 408 depends at least in part on at least the following according to a hypergeometric or other statistical calculation: an event count 802 indicating how many customers in the obtained data 202 have an event 432 of the same event type 702 as the event-entity pair 808 event; a pair count 810 indicating how many customers in the obtained data 202 have the event-entity pair 808; an entity count 804 indicating how many customers in the obtained data 202 have an event 432 with the same entity 602 as the event-entity pair 808; and a customer count 806 indicating how many customers 204 appear in the obtained data.

One of skill will acknowledge that different attack campaigns may have different time frames. A low-and-slow attack against relatively hardened targets, for example, may infiltrate a network over the course of months, or even years. By contrast, some attack campaigns that spray compromised passwords against many accounts of dozens or hundreds of customers tend to occur over the course of a day or less, possibly even within an hour or two. Teachings provided herein may be applied to improve detection of low-and-slow attacks against customers, or to improve detection of rapid attacks against customers.

However, some embodiments focus on detection of rapid attack campaigns, and therefore operate on a basis that shared activity within a shorter time period makes anomalousness 408 more likely. In some embodiments, the obtained data 202 represents activities within a specified time period 418, and determining 906 whether sharing of the shared activity among the customers is anomalous depends at least in part on the length of the time period, such that for a given shared activity a shorter time period yields a determination of anomalousness with greater confidence 824 than for a longer time period, all other things (shared activity, number of customers, etc.) being equal.

One of skill will acknowledge that the dependence of anomalousness confidence 824 on time period 418 length may be implemented in various ways, with either discrete or continuous behavior. A discrete dependence behavior, for instance, may multiply a normalized anomalousness measure by 1.0 for shared behavior that is within a 30-minute period, by 0.8 for shared behavior that is in a 60-minute period, by 0.6 for shared behavior that is in a 120-minute period, and by 0.2 for shared behavior that is not within a 120-minute period. A continuous dependence behavior, for instance, may multiply the normalized anomalousness measure by $100/(100+t)$ where t is the length of the time period in minutes. These are merely examples; many other dependence behaviors may also or instead be implemented in a given embodiment.

As noted, not every shared behavior indicates an attack campaign, and further, not every anomalous shared behavior indicates an attack campaign. In particular, some authorized updates may be anomalous but benign. Accordingly, some embodiments look in the shared activity data 304 for an authorized vendor. For example, an update to an application 124 that is used by multiple customers might happen infrequently and might also use the same update process name on every customer system, making the update an anomalous shared activity. But if the update comes from a recognized and authorized source, it is not treated as an attack campaign indicator 424.

Thus, some embodiments recognize 1026 an authorized vendor 826 in at least a portion of the shared activity, and exclude that portion of the activity from the shared activity data 304 on which attack detection would be based, in response to recognizing the authorized vendor.

The presence of an authorized vendor may be recognized 1026, e.g., from a digital signature on signed code or other digitally signed update content 118. Alternately or in addition, an authorized vendor 826 may be recognized 1026 by its ownership of a block of IP addresses 628 that includes the IP address(es) from which the update content is received 1020.

In some embodiments, the statistical measure 506 used to assess anomalousness is defined using deterministic rules 820 specifying entity frequency with stated thresholds, e.g., an anomaly is found if the shared data includes more than five instances of a given entity (e.g., username "DVader") within the most recent sixty minutes. More generally, in some embodiments determining 906 whether sharing of the shared activity among the customers is anomalous 408 includes applying 1028 a deterministic rule 820 governing entity frequency 1030.

Service providers 210 are expected to respect customer privacy and confidentiality. One of skill will acknowledge that in the absence of the present teachings, most if not all activity data of a customer A is routinely fully separated by a service provider from activity data of a customer B. The service provider 210 may access both customers' respective activity data, e.g., to prepare respective invoices, but data 202 of different customers is not treated collectively as a unit. Moreover, security measures are routinely taken to prevent one cloud tenant from accessing data of another cloud tenant.

Such data separations and security measures make the present innovative sharing analysis surprising, because data of different customers is treated collectively. Indeed, some may feel that shared activity identification 904 and use 906 of a shared activity data subset 304 poses a privacy concern or a confidentiality concern.

However, embodiments according to the present teachings can be implemented with proper respect for privacy and confidentiality. Embodiments are compatible with, and independent of, security measures that prevent one cloud tenant from accessing data of another cloud tenant. Also, activity data of each customer may still be fully separated by a service provider from the activity data of the other customers, other than for the identification of shared activity data. No modification is needed to existing customer invoicing processes, for example, to perform multitenant shared activity analysis for attack campaign detection.

Some embodiments further support privacy and confidentiality in particular ways. In some embodiments, a service provider provides 1032 a security service to a particular customer pursuant to an agreement 508 by which the particular customer consents to inclusion of specified kinds of data in the obtained data 202; accordingly, the customer also consents to potential inclusion of the specified kinds of data in the shared activity data subset 304. For example, the agreement may state that only particular event types 702, or particular entities 602, or particular monitored systems 102, or particular time periods 418, or some combination thereof, is subject to potential inclusion in the shared activity data subset 304. Limitations on processing the data 202 may be part of the agreement 508. The security service provided may include campaign attack detection 1000 as taught herein, which is beneficial to the consenting customer because such detection cannot be performed by the consenting customer, because no individual customer has access to the requisite activity data of other customers.

In some embodiments, a service provider supports customer privacy and confidentiality by producing 1034 hashed data 510, 202 from corresponding non-hashed data 202, then including 904 some or all of the hashed data in the shared activity subset 304. A hash may serve as an entity ID or as an ID of other confidential activity data 202, for anomalousness analysis. The service provider also excludes 1036 the corresponding non-hashed data from the shared activity subset. In some embodiments, the service provider goes further, by excluding any non-hashed data from the shared activity subset. Familiar hashing mechanisms may be employed.

Some embodiments may be implemented using an entity store. In such an embodiment, determining 906 whether sharing of the shared activity among the customers is anomalous includes maintaining 1038 a respective entity store 634 for multiple customers. Each entity store includes an entity count 804 for each of a plurality of entities 602 or a plurality of entity groups 636. The anomalousness determining 906 also includes tracking 1040 changes in entity counts over time; and utilizing 1042 a presence of matching changes over time in an entity count for two or more customers as an indication 424 of an attack campaign against those customers, with the attack campaign involving the corresponding entity or entity group.

For example, suppose customers A, B, and C have respective entity stores 634 for a group 636 known-process-names defined as process names encountered between two weeks ago and two months ago, a group 636 new-process-names defined as process names not in known-process-names, a group 636 known-domain-names defined as domain names encountered between two weeks ago and two months ago, and a group 636 new-domain-names defined as domain names not in known-domain-names. Suppose further that size of each group (number of names, a.k.a. "count") is stored in the entity stores weekly, and that the groups and their counts are updated weekly.

Then an increase (percentage or absolute) in the size of the customer A new-process-names group may not, by itself, be suspect. But an embodiment may treat corresponding increases in the respective sizes of the customer A new-process-names group, the customer B new-process-names group, and the customer C new-process-names group, as an attack indicator 424. If there are also corresponding increases in the sizes of the three customers' new-domain-names groups, then confidence 824 that an attack is indicated would be even higher. This is one example. One of skill will understand that anomalies based on entity stores for other entities, other entity groups, other time periods, and other customer counts may also be used to detect an attack.

In some embodiments, the service provider 210 is a cloud service provider. In some, the service provider 210 also or instead fills one or more of the following roles: managed services provider, internet service provider, storage service provider, hosting service provider, Software as a Service (SaaS) provider, Infrastructure as a Service (IaaS) provider, or Platform as a Service (PaaS) provider.

Configured Storage Media

Some embodiments include a configured computer-readable storage medium 112. Storage medium 112 may include disks (magnetic, optical, or otherwise), RAM, EEPROMS or other ROMs, and/or other configurable memory, including in particular computer-readable storage media (which are devices, and hence not mere propagated signals or mere energy). The storage medium which is configured may be in particular a removable storage medium 114 such as a CD, DVD, or flash memory. A general-purpose memory, which may be removable or not, and may be volatile or not, can be configured into an embodiment using items such as a dataset search interface 414, a shared activity subset 304 of activity data which has been identified as representing activity 412 shared by multiple customers 204, activity data stores 434, software or hardware or both implementing a hypergeometric probability 502 calculation or other anomalousness statistical measure 506, hashing software or resultant hashes 510, or software fully or partially implementing flows shown in FIG. 9 or 10 for multitenant sharing anomalousness based attack campaign detection, in the form of data 118 and instructions 116, read from a removable storage medium 114 and/or another source such as a network connection, to form a configured storage medium. The configured storage medium 112 is capable of causing a computer system 102 to perform technical process steps for multitenant sharing anomalousness based attack campaign detection, as disclosed herein. The Figures thus help illustrate configured storage media embodiments and process (a.k.a. method) embodiments, as well as system and process embodiments. In particular, any of the process steps illustrated in FIG. 9 or 10, or otherwise taught herein, may be used to help configure a storage medium to form a configured storage medium embodiment.

Some embodiments use or provide a computer-readable storage device 112, 114 configured with data 118 and instructions 116 which upon execution by at least one processor 110 cause a cloud or other computing system to perform a cybersecurity method. This method includes: electronically obtaining 902 digital data 202 that represents activities 306 ascribed collectively to at least three customers 204 of a service provider 210; computationally identifying 904, within the obtained data 202, a shared activity subset 304 which represents a shared activity 412, the shared activity 412 being an activity 306 that is ascribed to N of the customers, where N is an integer greater than one; computationally determining 906 that sharing 422 of the shared activity among the customers is anomalous 408; and treating 908 the shared activity as an indicator 424 of a cybersecurity attack campaign 406.

In some embodiments, the computing system 402 is free of any alert that is based on a portion of the shared activity subset that is ascribed to exactly one of the customers. That is, the innovative method catches 1044 an attack 404 that was missed 1046 by all the localized attack detection analyses 206 and localized detection tools 122. This may occur because data 202 that appears benign in the context of a single tenant's activity can help indicate an attack 404 when the same or similar data is found in the activity data of additional tenants 204, depending on factors discussed herein.

One such factor is the extent of similarity, e.g., whether entity values are identical or instead only match a pattern 632. In some embodiments, entity values that are non-identical yet match an easily generated pattern, e.g., producing entities that have the same root portion plus an incremented or random portion, are deemed more suspicious than merely identical values. The use of the pattern is interpreted as an effort to avoid detection by avoiding reuse of a given value.

Another factor is the time frame. As noted elsewhere herein, some embodiments deem shared activity which occurred within a shorter time frame 418 more suspicious than shared activity within a longer time frame 418.

Another factor is the likelihood of sharing. A lower probability of finding the particular shared data 304 corresponds to a higher confidence that the shared data indicates an attack when the shared data is present. Probabilities may be calculated relative to a baseline system which is presumed to be not under attack.

In some embodiments, each portion of the shared activity subset that is ascribed to a particular customer is attributed to a respective time period 418, and all of the time periods overlap one another, i.e., the union of the time periods is not empty. In other embodiments, a shared activity occurs at non-overlapping times for different customers.

In some embodiments, treating 908 the shared activity as an indicator of a cybersecurity attack campaign includes at least one of the following: generating 1048 a security alert 514; enhancing 1050 a security requirement 516; increasing 1052 logging 518 or auditing 520 or both; or suspending 1054 an account 522. Each of these operations may be performed using familiar tools and techniques, as a result of the determination that an attack is indicated using enhancements taught herein.

In some embodiments, the method is performed at a production performance level 918 by satisfying at least one of the following performance level constraints 920: a constraint 920 specifying that the obtained digital data 202 represents activities 306 ascribed collectively to at least ten customers 204 of the service provider 210; a constraint 920 specifying that the shared activity subset 304 represents activities 306 ascribed to each of at least five customers 204 of the service provider 210; or a constraint 920 specifying that the shared activity 412 results in an indication 424 of a past or current presence of a cybersecurity attack campaign 406 against each of at least three customers 204 of the service provider 210.

Additional Examples and Observations

One of skill will recognize that not every part of this disclosure, or any particular details therein, are necessarily required to satisfy legal criteria such as enablement, written description, or best mode. Any apparent conflict with any other patent disclosure, even from the owner of the present innovations, has no role in interpreting the claims presented in this patent disclosure. With this understanding, which pertains to all parts of the present disclosure, some additional examples and observations are offered in the following sections.

Some embodiments perform security campaign 406 detection through common entity 304, 602 identification 904. Security attack campaigns 406 have a significant cross-customer impact, so their early detection is advantageous. Some embodiments described herein compare notable events 432 (e.g., new user creation) within some defined time window 418 (e.g., 1 day) across multiple customers 204. Identifying events 432 that share a common entity 602 (e.g., the username) across different customers 204 may reveal an anomaly 408 that indicates 424 the notable events are part of an attack campaign 406.

Some embodiments reduce the noise facing the detection procedure, to control for a probability 502 of observing the common entity 602 across these customers 204. Noise reduction may take into account the number of customers for which the event was observed, the number of customers for which the common entity was observed in the event, the number of customers that had this entity in their logs in the past, and the total number of customers for which the detection system 402 has data. A hypergeometric p-value 502 can be calculated on such a basis to evaluate anomalousness, namely, the probability that this common entity was detected at random in the absence of an attack.

In some embodiments, an enhanced system 402 is composed using the following components.

A data collector 414 collects data 202 used in the system 402 from relevant data sources, and extracts the entities 602, the events 432, or both. For example, data 202 may be obtained 902 as alerts data, resource manager data, login events, or other activity data. The data 202 may be collected in streaming or in batch mode, and may be stored in the system's database or other store 634.

A second component is a common entity identifier portion of software 410. This component processes the data 202 collected by the data collector to identify 904 entities 602 that repeatedly appear in the data 202 of different customers 204, and therefore might be part of a security campaign 406. For example, the component may identify multiple login events in a short timeframe 418 from the same IP address 628 to virtual machines that belong to different customers 204. This shared activity data 304 may indicate that an attacker who managed to get credentials of many virtual machines is trying to access those virtual machines. These and other shared activity signals can be defined as deterministic rules, e.g., sharing is found if more than 5 instances of the entity were in events within the most recent 60 minutes.

Another portion of the software 410 performs confidence 824 evaluation. The suspicious entities 304, 602 highlighted by the previously noted component go to a noise reducer portion of the software 410. A goal of the noise reducer is to refine the results by removing cases which are not deemed sufficiently suspicious, e.g., whose confidence 824 or probability 502 or other measure 506 is below a specified threshold.

Noise reduction may take into account, e.g., the number of customers for which the event was observed, the number of customers for which the common entity was observed in the event, the number of customers that had this entity in their logs in the past, and the total number of customers for which data is available. The confidence evaluation component uses statistical models to decide which entities 602 are suspicious. For example, a hypergeometric p-value 502 can be used.

Another component of the enhanced system 402 in this example is an alert generator portion of software 410. This component takes the data 304 and wraps it into an object to be sent to the customers, e.g., to respective security or administrative personnel designated by a given customer 204. Such an alert 514 can contain additional information like an alert name, a free text description of the indicator 424, a recommendation to the customer on action 914 to be taken, a list of suspicious entities 602, etc.

By utilizing multitenant sharing analysis, an embodiment can supplement, or even avoid, campaign detection approaches that rely on the volume of the attack seen by any particular customer. Applying the statistical evaluation can supplement other approaches, enhancing overall detection sensitivity and allowing earlier detection of an attack campaign. Detection alerts may be processed by security researchers inside a service provider, and may be delivered to customers as activity alerts in a cloud SIEM, for example.

Additional support for the discussion above is provided below. For convenience, this additional support material appears under various headings. Nonetheless, it is all intended to be understood as an integrated and integral part of the present disclosure's discussion of the contemplated embodiments.

Technical Character

The technical character of embodiments described herein will be apparent to one of ordinary skill in the art, and will also be apparent in several ways to a wide range of attentive readers. Some embodiments address technical activities such as identifying shared activity subsets 304 of computing system activity data 202, determining 906 whether sharing 422 represented by a data subset 304 is anomalous 408, and mitigating 914 cyberattacks 404, which are each an activity deeply rooted in computing technology. Some of the technical mechanisms discussed include, e.g., a dataset search interface 414, attack campaign detection software 410, attack mitigation tools 430, data stores 634, software for calculating a hypergeometric probability 502, various mechanisms for recognizing randomization patterns 632 in system activity data 202, and alert 514 generators. Some of the technical effects discussed include, e.g., catching 1044 a cyberattack 404 that was missed (at least thus far) by localized detection tools 122, detecting 1000 a campaign 406 that includes attacks 404 against multiple cloud tenants 204, distinguishing 1026 anomalous but legitimate activity from anomalous activity that indicates an attack 404, and protecting 1034, 1036, 1032 customer privacy and confidentiality while monitoring a cloud to detect attacks 404. Thus, purely mental processes and activities limited to pen-and-paper are clearly excluded. Other advantages based on the technical characteristics of the teachings will also be apparent to one of skill from the description provided.

Some embodiments described herein may be viewed by some people in a broader context. For instance, concepts such as computational cost, efficiency, privacy, recency, or security may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as how to rapidly detect attack campaigns even when existing localized tools do not. Other configured storage media, systems, and processes involving computational cost, efficiency, privacy, recency, or security are outside the present scope. Accordingly, vagueness, mere abstractness, lack of technical character, and accompanying proof problems are also avoided under a proper understanding of the present disclosure.

Additional Combinations and Variations

Any of these combinations of code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

More generally, one of skill will recognize that not every part of this disclosure, or any particular details therein, are necessarily required to satisfy legal criteria such as enablement, written description, or best mode. Also, embodiments are not limited to the particular motivating examples and scenarios, threats, events, entities, time period examples, software processes, security tools, identifiers, data structures, data selections, naming conventions, notations, groupings, calculations, formulas, or other implementation choices described herein. Any apparent conflict with any other patent disclosure, even from the owner of the present innovations, has no role in interpreting the claims presented in this patent disclosure.

Acronyms, Abbreviations, Names, and Symbols

Some acronyms, abbreviations, names, and symbols are defined below. Others are defined elsewhere herein, or do not require definition here in order to be understood by one of skill.

ALU: arithmetic and logic unit
API: application program interface
BIOS: basic input/output system
CD: compact disc
CPU: central processing unit
DVD: digital versatile disk or digital video disc
FPGA: field-programmable gate array
FPU: floating point processing unit
GPU: graphical processing unit
GUI: graphical user interface
HTTP(S): hypertext transfer protocol (secure)
IaaS or IAAS: infrastructure-as-a-service
ID: identification or identity
IoT: Internet of Things
IP: internet protocol
LAN: local area network
OS: operating system
PaaS or PAAS: platform-as-a-service
RAM: random access memory
ROM: read only memory
TCP: transmission control protocol
TLS: transport layer security
TPU: tensor processing unit
UDP: user datagram protocol
UEFI: Unified Extensible Firmware Interface
URI: uniform resource identifier
URL: uniform resource locator
WAN: wide area network Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

A "computer system" (a.k.a. "computing system") may include, for example, one or more servers, motherboards, processing nodes, laptops, tablets, personal computers (portable or not), personal digital assistants, smartphones, smartwatches, smart bands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

An "administrator" (or "admin") is any user that has legitimate access (directly or indirectly) to multiple accounts of other users by using their own account's credentials. Some examples of administrators include network administrators, system administrators, domain administrators, privileged users, service provider personnel, and security infrastructure administrators.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

A "routine" is a callable piece of code which normally returns control to an instruction just after the point in a program execution at which the routine was called. Depending on the terminology used, a distinction is sometimes made elsewhere between a "function" and a "procedure": a function normally returns a value, while a procedure does not. As used herein, "routine" includes both functions and procedures. A routine may have code that returns a value (e.g., sin(x)) or it may simply return without also providing a value (e.g., void functions).

"Service" means a consumable program offering, in a cloud computing environment or other network or computing system environment, which provides resources to multiple programs or provides resource access to multiple programs, or does both.

"Cloud" means pooled resources for computing, storage, and networking which are elastically available for measured on-demand service. A cloud may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write).

"IoT" or "Internet of Things" means any networked collection of addressable embedded computing or data generation or actuator nodes. Such nodes may be examples of computer systems as defined herein, and may include or be referred to as a "smart" device, "endpoint", "chip", "label", or "tag", for example, and IoT may be referred to as a "cyber-physical system". IoT nodes and systems typically have at least two of the following characteristics: (a) no local human-readable display; (b) no local keyboard; (c) a primary source of input is sensors that track sources of non-linguistic data to be uploaded from the IoT device; (d) no local rotational disk storage—RAM chips or ROM chips provide the only local memory; (e) no CD or DVD drive; (f) embedment in a household appliance or household fixture; (g) embedment in an implanted or wearable medical device; (h) embedment in a vehicle; (i) embedment in a process automation control system; or (j) a design focused on one of the following: environmental monitoring, civic infrastructure monitoring, agriculture, industrial equipment monitoring, energy usage monitoring, human or animal health or fitness monitoring, physical security, physical transportation system monitoring, object tracking, inventory control, supply chain control, fleet management, or manufacturing. IoT communications may use protocols such as TCP/IP, Constrained Application Protocol (CoAP), Message Queuing Telemetry Transport (MQTT), Advanced Message Queuing Protocol (AMQP), HTTP, HTTPS, Transport Layer Security (TLS), UDP, or Simple Object Access Protocol (SOAP), for example, for wired or wireless (cellular or otherwise) communication. IoT storage or actuators or data output or control may be a target of unauthorized access, either via a cloud, via another network, or via direct local access attempts.

"Access" to a computational resource includes use of a permission or other capability to read, modify, write, execute, move, delete, create, or otherwise utilize the resource. Attempted access may be explicitly distinguished from actual access, but "access" without the "attempted" qualifier includes both attempted access and access actually performed or provided.

"Secured" means only that some security is provided, not that the effectiveness of the security is guaranteed.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided. Steps performed automatically are presumed to include at least one operation performed proactively.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment, particularly in real-world embodiment implementations. Multitenant sharing anomaly analysis operations such as obtaining 902 activities data 202 in a RAM, computationally identifying 904 a shared activity subset 304 of the data, and computationally determining 906 whether the subset 304 represents anomalous sharing and whether that anomaly represents an attack 404, and many others taught herein, are understood to be inherently digital and to involve processing kilobytes of data 202 per second (megabytes per second in many embodiments). A human mind cannot interface directly with a CPU or other processor, or with RAM or other digital storage, to read and write the necessary data to adequately perform the multitenant sharing anomaly analysis steps for attack campaign detection 1000 taught herein. This would all be well understood by persons of skill in the art in view of the present disclosure. Pencil and paper, or a human mind alone, are simply unable to do the processing required. Tailored computing capabilities are needed.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated features is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

One of skill will recognize that this innovation disclosure discusses various data values and data structures, and recognize that such items reside in a memory (RAM, disk, etc.), thereby configuring the memory. One of skill will also recognize that this innovation disclosure discusses various algorithmic steps which are to be embodied in executable code in a given implementation, and that such code also resides in memory, and that it effectively configures any general-purpose processor which executes it, thereby transforming it from a general-purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as analyzing, applying, ascertaining, ascribing, assessing, calculating, catching, characterizing, creating, depending, determining, enhancing, generating, hashing, identifying, increasing, maintaining, mitigating, obtaining, producing, providing, receiving, recognizing, searching, sending, suspending, tracking, triggering, utilizing, (and analyzes, analyzed, applies, applied, etc.) with regard to a destination or other subject may involve intervening action such as the foregoing or forwarding, copying, uploading, downloading, encoding, decoding, compressing, decompressing, encrypting, decrypting, authenticating, invoking, and so on by some other party, including any action recited in this document, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment 102 computer system, also referred to as a "computational system" or "computing system", and when in a network may be referred to as a "node"

104 users, e.g., user of an enhanced system 402

106 peripherals 108 network generally, including, e.g., LANs, WANs, software-defined networks, clouds, and other wired or wireless networks 110 processor 112 computer-readable storage medium, e.g., RAM, hard disks; also referred to broadly as "memory", which may be volatile or nonvolatile, or a mix 114 removable configured computer-readable storage medium 116 instructions executable with processor; may be on removable storage media or in other memory (volatile or nonvolatile or both)

118 data generally 120 kernel(s), e.g., operating system(s), BIOS, UEFI, device drivers 122 tools, e.g., anti-virus software, firewalls, packet sniffer software, intrusion detection systems, intrusion prevention systems, other cybersecurity tools, debuggers, profilers, compilers, interpreters, decompilers, assemblers, disassemblers, source code editors, auto-completion software, simulators, fuzzers, repository access tools, version control tools, optimizers, collaboration tools, other software development tools and tool suites (including, e.g., integrated development environments), hardware development tools and tool suites, diagnostics, and so on 124 applications, e.g., word processors, web browsers, spreadsheets, games, email tools, commands 126 display screens, also referred to as "displays"

128 computing hardware not otherwise associated with a reference number 106, 108, 110, 126

130 cloud, also sometimes referred to as a cloud computing environment 200 computing environment 100 which is free of innovations or other enhancements taught herein; architecture of such an environment 202 activity data; digital data 118; represents activities in a computing system 102 or environment 100; some examples include data of the kind fed to or produced by a SIEM, intrusion detection system, or other security control 204 customer, e.g., tenant, organization, corporation, or other service recipient which has a service agreement or service relationship with a service provider 210; individual users 104 are not customers 204, because at least a majority of a customer's activity data 202 is segregated or otherwise separated by a security mechanism or an architecture from the activity data 202 of other customers of the same service provider 210 including even administrative users, but admin users of a customer C can access activity data of regular users of the same customer C; a customer has a direct service and legal relationship with the service provider, whereas most if not all users 104 have only an indirect relationship with the service provider via the user's enveloping customer; SIEM services, in-house security personnel, and security policies about exfiltration are also generally on a per-customer basis not a per-user basis; customers typically have responsibility and authority for multiple accounts 206 customer-localized analysis, e.g., attack detection analysis performed on the basis of activity data from only one customer 204; also refers to software or hardware or both which performs such an analysis 208 service provided by service provider 210, e.g., access to a cloud 130, SaaS, IaaS, PaaS, IaaS, internet access 210 service provider, e.g., a business that provides one or more services 208 to customers 204, e.g., a cloud service provider; also refers to digital presence of a service provider 300 environment 100 which includes at least one innovation or other enhancement taught herein; architecture of such an environment 302 multitenant sharing anomaly analysis, e.g., an attack detection analysis performed at least in part based on determining whether sharing of activity by multiple customers 204 is anomalous; also refers to software or hardware or both which performs such an analysis 304 shared activity data, e.g., data 202 which represents an activity shared by more than one customer 306 customer activity generally in a computing environment; this activity is represented by activity data 202; contrast activity generally 306 with shared activity 412 in particular; activity 306 or 412 is represented in a computing system by activity data 202 and in particular is often represented by event 432 data structures 402 computing system 102 enhanced with multitenant-sharing-anomaly-based attack detection functionality taught herein, e.g., with one or more of a shared activity data 304 based anomalousness 408 assessment 502 or 506 or both, campaign detection software 410, functionality according to FIG. 9 or 10, or any other functionality first taught herein 404 cyberattack, e.g., violation of policy or regulation or law regarding access level, authorized usage, privacy, confidentiality, availability, or designed functionality of a computing system of a customer 204

406 attack campaign, e.g., a set of coordinated attacks 404 against more than one customer 204

408 anomalousness of activity sharing by multiple customers; also refers to an anomaly which includes activity sharing by multiple customers; represented digitally 410 campaign detection software, e.g., software which performs at least shared activity subset identification 906 and sharing anomalousness determination 906

412 activity 306 which is shared by multiple customers 204; whether activity is shared depends on the sharing parameters in a given situation such as time frame for actions and whether entities must be identical or can also match a pattern 632, e.g., customer A and customer B may share an activity of creating an account with a username containing the string "DVader" within the past ten hours, with the shared activity represented by a packet capture for A and a log entry for B 414 dataset search interface, e.g., an interface 428 tailored for obtaining 902 activity data; may be tailored to obtain only particular activity data such as only particular events 432 or only data from a specified time frame 418; may also be tailored to identify 904 shared activity data 418 time period; also referred to as time frame or window; may be a specific single time, a range of time in relative terms (e.g., most recent thirty minutes, yesterday), or a range of time in absolute terms (e.g., 13 Sep. 2021 from 13:00 through 14:00 United States Eastern Standard Time); represented digitally 420 multitenant-sharing-anomaly-based attack detection functionality taught herein, generally; also refers to software or hardware or both which performs or provides such functionality upon execution; some examples include campaign detection software 410, enhanced system 402, method 900 and implementations thereof, method 1000 and implementations thereof which include at least steps 904 and 906

422 sharing of activity, by two or more customers; sharing may be non-anomalous, or anomalous but benign, or anomalous and inadvertently dangerous to privacy or resource availability or data integrity or data confidentiality, or anomalous and maliciously dangerous, for example 424 campaign indicator, e.g., a data configuration indicating the presence of an attack campaign 406; the configuration may be defined in terms of data 202 found (e.g., account creation events) or data 202 not found (e.g., no digital signature of recognized vendor) or both; an indicator may have an associated severity, e.g., creation of anomalous admin accounts in several customers may receive a greater severity rating than the creation of anomalous non-admin accounts in those customers would receive 426 footprint of an attack campaign 406, e.g., logged events, files modified, files encrypted, files downloaded, storage consumed, bandwidth consumed, processing cycles consumed, other changes in system 102 state caused by the attack campaign 428 interface generally to a system 102 or portion thereof; may include, e.g., shells, graphical or other user interfaces, network addresses, APIs, network interface cards, ports 430 attack mitigation tool, e.g., anti-virus software, firewalls, packet sniffer software, intrusion detection systems, intrusion prevention systems, or other cybersecurity tool which upon execution mitigates risk, e.g., by a mitigation operation 914

432 event in a computing system; also refers to digital data representing an event in a computing system 434 data storage artifact holding activity data 202

436 dataset holding activity data 202 of a particular customer; may be stored in one or more stores 434; unless otherwise stated, each dataset 436 holds activity data of exactly one customer 204

502 hypergeometric probability; digital; also refers to software which calculates a hypergeometric probability, and to the usage of hypergeometric probability in functionality 420

504 shared activity or data 202 representing shared activity, which does not indicate an attack campaign 506 statistical measure of sharing anomalousness; digital; also refers to software which calculates such a statistical measure, and to the usage of such a statistical measure in functionality 420

508 de facto or formal agreement allowing a service provider or other provider of a functionality 420 service to utilize data 202 to which they would not otherwise have legitimate access 510 hashing software; also refers to hashes produced by hashing software; may be produce using any familiar or hereafter formulated hashing algorithm 512 security risk, e.g., a risk to confidentiality, integrity, or availability of data or of a resource in a computing system 102

514 security alert; digital; e.g., notification of a specific security risk 516 security requirement, e.g., requirement for multifactor authentication, human review and approval of access request, auditing, logging 518 event logging in a system 102; also refers to digital event log 520 event auditing in a system 102, e.g., review of log 522 account in system 102

602 entity; digital; refers to an event 432 entity type, or to a particular entity or a particular entity value, according to context; not to be confused with a legal entity, e.g., a business or a corporation; in a Microsoft Azure® Sentinel® environment, for example, entity types are defined to represent user account, host, IP address, and similar items (mark of Microsoft Corporation); an entity may also be referred to as a property, field, attribute, or other portion of an event data structure 604 username; represented digitally 606 username randomization pattern, e.g., mechanism for recognizing or generating a set of usernames 608 user agent in a network communication, e.g., HTTP or HTTPS communications; represented digitally 610 user agent randomization pattern, e.g., mechanism for recognizing or generating a set of user agents 612 process, in the computing sense as opposed to the patent law sense 614 process name; represented digitally 616 process name randomization pattern, e.g., mechanism for recognizing or generating a set of process names 618 file; a digital unit of storage, typically with a name and a location in a file system 620 file name; represented digitally 622 file name randomization pattern, e.g., mechanism for recognizing or generating a set of file names 624 domain name; may also refer to a domain itself; represented digitally; may refer to a trust domain or a Domain Name System domain or both 626 domain name randomization pattern, e.g., mechanism for recognizing or generating a set of domain names 628 IP address; represented digitally; may be IPv4 or IPv6

630 IP address subnet; digital representation of a set of IP addresses; may serve as an IP address randomization pattern when addresses matching the subnet are employed 632 randomization pattern generally; some examples are referred to herein by reference numerals 606, 610, 616, 622, 626, 630

634 entity store; digital storage of entities 602 and associated tallies 636 group of entities 602; represented digitally 702 event type; digital; category of event 432, e.g., account creation, process creation, login attempt, etc.

706 creation of an account 522; refers to computational action or to data 202 representing action or both, according to context 708 file 618 containing a binary version of software or a binary version of a resource (e.g., database table, image) used by software 710 receipt of a file 618; refers to computational action or to data 202 representing action or both, according to context 712 creation of a process 612; refers to result of computational action or to data 202 representing action or both, according to context 714 receipt (receiving) via network communication of data 118; refers to computational action or to data 202 representing action or both, according to context 716 transmission (sending) via network communication of data 118; refers to computational action or to data 202 representing action or both, according to context 802 count of events 432; digital 804 count of entities 602; digital 806 count of customers 204; digital 808 pair of event and entity, e.g., account creation event with username DVader, account login event with username DVader, and process name creation event with process name DVader are each a different pair 808; digital 810 count of pairs 808; digital 812 population in a statistical sense; represented digitally 814 size of a population 812; digital 816 sample in a statistical sense; represented digitally 818 size of a sample 816; digital 820 deterministic rule operational as an anomalousness 408 threshold or other anomalousness 408 criterion; implemented in a computing system 822 number of hits or successes or matches found in a sample, in a statistical sense; represented digitally 824 confidence level or value, as applied to a campaign indicator; digital; generally higher confidence means the campaign is more likely present 826 vendor of software or services, or an identification thereof such as a name or ID number; digital 828 number of hits or successes or matches found in a population, in a statistical sense; represented digitally 900 flowchart; 900 also refers to attack campaign detection methods illustrated by or consistent with the FIG. 9 flowchart 902 computationally obtain activity data 202 for multiple customers 204, that is, activity data D1 for customer C1, data D2 of C2, and so on, recognizing that some of the activities (albeit not the underlying data 202) may be shared by multiple customers; may be accomplished using, e.g., file reads, log reads, SIEM communications, packet sniffing, other computational mechanisms 904 computationally identify a shared activity subset 304, e.g., by searching datasets 436 for particular event types or entity values, calculating dataset intersections, filtering for common values, comparing sort results, executing database queries, or other computational procedures 906 computationally determine whether sharing is anomalous, e.g., by calculating a statistical measure of a probability that shared data would be found and comparing that statistical measure to a threshold 908 computationally characterize shared activity as an attack indicator, e.g., by noting 910 a determination that the shared activity is anomalous and also noting that no legitimacy indicator such as an authorized vendor ID has been recognized 1026 as part of the shared activity 910 computationally find sharing is anomalous; also refers to a possible outcome of the determining step— not finding an anomaly is another possible outcome, and no result (e.g., calculation error) is a third possible outcome 912 computationally characterize shared activity as not being an attack indicator, e.g., by noting 910 a determination that the shared activity is not anomalous or by noting that a legitimacy indicator such as an authorized vendor ID has been recognized 1026 as part of the shared activity, or both 914 computationally mitigate an attack, e.g., by execution of a mitigation tool 430 or other operation such as (a) reporting an apparent attack in a text message, email, generated-voice message, printout, alert, screen display, or other communication to an administrator or to security personnel or both, (b) triggering a defense, e.g., by making a remote procedure call, or by sending a message, signal, or other digital action or communication to a tool such as an intrusion prevention system, firewall, or exfiltration prevention tool in order to request (as a possible action or as a command) that the triggered tool impose an access restriction, (c) imposing an access restriction, (d) locking an account, (e) blocking a location, e.g., an IP address or device or geolocation, (f) requiring additional authentication before permitting access, e.g., a one time password (OTP) sent by text message or email or generated by an authenticator app, or a biometric credential such as a fingerprint scan result, voiceprint, face recognition, or iris scan result, or a verified presence of a hardware token, or a digital token or certificate, or (g) taking any other computational action identified herein as a risk mitigation or familiar as a cyberattack risk mitigation 916 computationally assess whether to continue monitoring for a campaign attack, e.g., check for a command or condition to stop monitoring 918 performance level of an implementation of a campaign detection method in a particular situation 920 performance level constraint; satisfaction of constraint helps indicate performance level 1000 flowchart; 1000 also refers to attack campaign detection methods illustrated by or consistent with the FIG. 10 flowchart (which incorporates the steps of FIG. 9)

1002 computationally trigger a mitigation operation 914

1004 computationally ascribe activity to a customer, e.g., by storing activity data 202 in storage 112 allocated to the customer or associating activity data 202 with a digital identification of the customer 1006 calculate a hypergeometric probability; performed by a computing system 102 not by a human mind 1008 computationally utilize a customer-localized tool, e.g., by execution of a customer-localized mitigation tool 430

1010 computationally ascertain use of a randomization pattern 632, e.g., by (a) feeding a set of entity values to a regular expression generator and receiving in response a regular expression that generates (matches) all of those entity values as opposed to a result indicating no matching regular expression (aside from a trivial one such as a mere list repeating the values) was generated, or by (b) identifying a root string common to a set of entity values; a given embodiment may ascertain 1010 use of a randomization pattern 632 from a proper subset of the available entity values, such as a majority subset or a subset including at least three entity values, with the root string having at least a specified length such as at least four characters 1012 calculate a statistical measure 506; performed by a computing system 102 not by a human mind 1014 computationally create an account 522; performed by a computing system 102 not by a human mind 1016 computationally create a process 612; performed by a computing system 102 not by a human mind 1018 computationally send data 118; performed by a computing system 102 not by a human mind 1020 computationally receive data 118; performed by a computing system 102 not by a human mind 1022 computationally depend on an anomalousness analysis of an event-entity pair during an analysis 906 of multitenant sharing anomalousness, e.g., by producing 906 a different result for different event-entity pair values or by following different software execution paths for different event-entity pair values; performed by a computing system 102 not by a human mind 1024 computationally depend on a time period length during an analysis 906 of multitenant sharing anomalousness, e.g., by producing 906 a different result for different time period length values or by following different software execution paths for different time period length values; performed by a computing system 102 not by a human mind 1026 computationally recognize an authorized vendor, e.g., by string matching against a list of authorized vendor names or by hash matching against a hash of an authorized vendor name or other authorized vendor identification; performed by a computing system 102 not by a human mind 1028 computationally apply a deterministic rule 820 during an analysis 906 of multitenant sharing anomalousness; performed by a computing system 102 not by a human mind 1030 frequency of an event or an entity or an event-entity pair; may be absolute or relative; digital 1032 provide a computational service; may not be performed solely by human mind or solely with pen and paper 1034 computationally produce hashed data from activity data 202; performed by a computing system 102 not by a human mind 1036 computationally avoid use of non-hashed activity data 202 of a customer at the direction of, or under the control of, any legal person other than the customer, during campaign attack detection method execution; performed by a computing system 102 not by a human mind 1038 computationally maintain an entity store 634, e.g., by including values or updating values therein; performed by a computing system 102 not by a human mind 1040 computationally track changes in entity counts over time; changes may be from zero to one, or from M to N where M and N are both positive; performed by a computing system 102 not by a human mind 1042 computationally utilize changes in entity counts over time during an analysis 906 of multitenant sharing anomalousness; performed by a computing system 102 not by a human mind 1044 computationally catch a campaign attack which was missed 1046 by a customer-localized detection tool; catching 1044 may include, e.g., detecting an indicator 424 of the attack and characterizing 908 it as an indicator as opposed to mere activity data 202, or by triggering 1002 in response to the attack; performed by a computing system 102 not by a human mind 1046 computationally miss a campaign attack, e.g., by failing to characterize any part of a footprint of the attack as an attack indicator, and by failing to trigger mitigation in response to the attack 1048 computationally generate a security alert; performed by a computing system 102 not by a human mind 1050 computationally enhance a security requirement 516; the enhancement may include strengthening an existing security requirement 516 or adding or enabling a previously missing or disabled security requirement 516; performed by a computing system 102 not by a human mind 1052 computationally increase 1052 logging 518 or auditing 520 or both; increase may impact logging or auditing existence or frequency or detail level, for example; performed by a computing system 102 not by a human mind 1054 computationally suspend access to an account, or activity ascribed to the account, or both; performed by a computing system 102 not by a human mind 1056 any step discussed in the present disclosure that has not been assigned some other reference numeral

CONCLUSION

In short, the teachings herein provide a variety of cyberattack campaign detection functionalities which operate in enhanced systems 402. Some embodiments detect 1000 cyberattack 404 campaigns 406 against multiple cloud tenants 204 or other service provider 210 customers 204 by analyzing 302 activity data 202 to find sharing anomalies 408. Data 202 that appears 206 benign in the context of a single tenant's activities 306 may indicate 424 an attack 404 when the same or similar data 202, 304 is also found 904 for additional tenants 204. Attack detection 1000 may depend on activity time frames 418, on how similar 632 certain activities 412 of different tenants 204 are to one another, on how unusual 408 it is for different tenants 204 to share 422 an activity, and on other factors, e.g., confidence 824 in an indication 424, and whether an explanation legitimizing the shared activity exists, such as authorized software updates. Sharing anomaly analysis 302 may utilize 906 hypergeometric probabilities 502 or other statistical measures 506. Detection avoidance attempts using entity randomization 632 are revealed 1010 and thwarted 908. Authorized vendors 826 may be recognized 1026, mooting 912 anomalousness 408 of activity 304 involving the vendor. Although data 202 from multiple tenants 204 is analyzed 302 together for sharing anomalies 408 while monitoring 900 for attacks 404, tenant confidentiality and privacy are respected through technical and legal mechanisms, e.g., data agreements 508 and data hashing 510. Mitigation 914 is performed in response to an attack indication 424.

Embodiments are understood to also themselves include or benefit from tested and appropriate security controls and privacy controls such as the General Data Protection Regulation (GDPR), e.g., it is understood that appropriate measures should be taken to help prevent misuse of computing systems through the injection or activation of malware. Use of the tools and techniques taught herein is compatible with use of such controls.

Although Microsoft technology is used in some motivating examples, the teachings herein are not limited to use in technology supplied or administered by Microsoft. Under a suitable license, for example, the present teachings could be embodied in software or services provided by other cloud service providers.

Although particular embodiments are expressly illustrated and described herein as processes, as configured storage media, or as systems, it will be appreciated that discussion of one type of embodiment also generally extends to other embodiment types. For instance, the descriptions of processes in connection with FIGS. 9 and 10 also help describe configured storage media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Those of skill will understand that implementation details may pertain to specific code, such as specific thresholds, comparisons, specific kinds of runtimes or programming languages or architectures, specific scripts or other tasks, and specific computing environments, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A computing system equipped for detecting a cybersecurity attack campaign against multiple customers of a service provider, the computing system comprising:
    a digital memory;
    a datasets search interface connectable to a first customer events dataset and to a second customer events dataset, the first customer events dataset representing activities that are ascribed to a first customer, the second customer events dataset representing activities that are ascribed to a second customer; and
    a processor in operable communication with the digital memory, the processor configured to enhance cybersecurity by performing cybersecurity attack campaign detection steps which include (a) identifying via at least the datasets search interface a shared activity subset of the datasets which represents a shared activity, the shared activity being an activity that is ascribed to each of the customers, (b) determining whether customers' sharing of the shared activity is anomalous, (c) characterizing the shared activity as an indicator of a campaign attack when the sharing is anomalous, and (d) characterizing the shared activity as a non-indicator when the sharing is not anomalous;
    wherein the computing system resides in an environment having M customer events datasets which represent activities ascribed to M respective customers, the shared activity is an activity that is ascribed to exactly N of the M customers, N is an integer greater than one, and M is an integer greater than or equal to N;
    the processor is configured to calculate a statistical measure based on at least N and M, and the processor is also configured to determine whether sharing of the shared activity is anomalous based at least in part on the calculated statistical measure; and
    wherein operation of the computing system reduces a security risk of overlooking an attack campaign whose footprint appears benign within any single customer's dataset.

2. The computing system of claim 1, further comprising an attack mitigation tool, and wherein characterizing the shared activity as an indicator of a campaign attack triggers a mitigation operation by the attack mitigation tool.

3. The computing system of claim 1, wherein the statistical measure comprises a hypergeometric probability based on at least N and M, and the processor is configured to determine whether sharing of the shared activity is anomalous based at least in part on the calculated hypergeometric probability.

4. The computing system of claim 1, wherein the statistical measure comprises at least one of: a Z-score, an interquartile range, an unsupervised anomaly detection result, a time series data anomaly detection result, or a machine learning result.

5. The computing system of claim 1, wherein:
    the computing system resides in an environment having at least one customer-localized cybersecurity attack detection tool which is exposed to a particular customer's portion of the shared activity subset of the datasets that represents the shared activity;

the customer-localized cybersecurity attack detection tool is customer-localized in that the tool does not have access to more than one customer events dataset;

the customer-localized cybersecurity attack detection tool treats the shared activity subset portion as normal activity not indicative of an attack; and the computing system determines that sharing of the shared activity is anomalous and characterizes the shared activity as an indicator of a campaign attack.

6. A cybersecurity method, comprising:

electronically obtaining digital data that represents activities ascribed collectively to at least two customers of a service provider in an environment having M customer events datasets which represent activities ascribed to M respective customers;

computationally identifying, within the obtained data, a shared activity subset which represents a shared activity, the shared activity being an activity that is ascribed to exactly N of the customers, where N is an integer greater than one and M is an integer greater than or equal to N;

computationally determining that sharing of the shared activity among the customers is anomalous, the determining comprising calculating a statistical measure based on at least N and M, and determining that sharing of the shared activity is anomalous based at least in part on the calculated statistical measure; and treating the shared activity subset as an indicator of a cybersecurity attack campaign.

7. The method of claim 6, wherein the shared activity includes entities conforming with at least one of the following for each of the N customers:

a particular username;
a particular username randomization pattern;
a particular user agent;
a particular user agent randomization pattern;
a particular IP address;
a particular IP address subnet;
a particular domain name;
a particular domain name randomization pattern;
a particular process name;
a particular process name randomization pattern;
a particular file name; or
a particular file name randomization pattern.

8. The method of claim 6, wherein the shared activity includes, for each of the N customers, one or more events of at least one of the following event types:

creation of an account for a particular username;
receipt of a binary file of a particular name;
creation of a process having a particular process name;
receipt of data from a particular IP address or a particular domain; or
transmission of data to a particular IP address or a particular domain.

9. The method of claim 6, wherein shared activity data includes at least one event-entity pair, the event-entity pair including an instance of an event type and also including a particular entity, and wherein determining that sharing of the shared activity among the customers is anomalous depends at least in part on at least one of the following:

an event count indicating how many customers in the obtained data have an event of the same event type as the event-entity pair event;

a pair count indicating how many customers in the obtained data have the event-entity pair;

an entity count indicating how many customers in the obtained data have an event with the same entity as the event-entity pair; and a customer count indicating how many customers appear in the obtained data.

10. The method of claim 6, wherein the obtained data represents activities within a specified time period, and wherein determining that sharing of the shared activity among the customers is anomalous depends at least in part on the length of the time period, such that for a given shared activity a shorter time period yields a determination of anomalousness with greater confidence than a longer time period.

11. The method of claim 6, further comprising recognizing an authorized vendor in at least a portion of the shared activity, and excluding the portion from the shared activity in response to recognizing the authorized vendor.

12. The method of claim 6, wherein determining that sharing of the shared activity among the customers is anomalous includes applying a deterministic rule governing entity frequency.

13. The method of claim 6, further comprising at least one of the following:

providing a security service to a particular customer pursuant to an agreement by which the particular customer consents to inclusion of specified kinds of data in the obtained data; or producing hashed data from corresponding non-hashed data, including the hashed data in the shared activity subset, and excluding the corresponding non-hashed data from the shared activity subset.

14. The method of claim 6, wherein determining that sharing of the shared activity among the customers is anomalous comprises:

maintaining a respective entity store for multiple customers, each entity store including an entity count for each of a plurality of entities or entity groups;

tracking changes in entity counts over time; and utilizing a presence of matching changes over time in an entity count for two or more customers as an indication of an attack campaign against those customers involving the corresponding entity or entity group.

15. The method of claim 6, wherein the service provider is a cloud service provider.

16. A computer-readable storage device configured with data and instructions which upon execution by a processor cause a computing system to perform a cybersecurity method, the method comprising:

electronically obtaining digital data that represents activities ascribed collectively to at least three customers of a service provider in an environment having M customer events datasets which represent activities ascribed to M respective customers;

computationally identifying, within the obtained data, a shared activity subset which represents a shared activity, the shared activity being an activity that is ascribed to exactly N of the customers, where N is an integer greater than one and M is an integer greater than or equal to N;

computationally determining that sharing of the shared activity among the customers is anomalous, the determining comprising calculating a statistical measure based on at least N and M, and determining that sharing of the shared activity is anomalous based at least in part on the calculated statistical measure; and treating the shared activity as an indicator of a cybersecurity attack campaign.

17. The storage device of claim 16, wherein the computing system is free of any alert that is based on a portion of the shared activity subset that is ascribed to exactly one of the customers.

18. The storage device of claim 16, wherein each portion of the shared activity subset that is ascribed to a particular customer is attributed to a respective time period, and wherein all of the time periods overlap one another.

19. The storage device of claim 16, wherein treating the shared activity as an indicator of a cybersecurity attack campaign comprises at least one of the following:
   generating a security alert;
   enhancing a security requirement;
   increasing logging or auditing or both; or
   suspending an account.

20. The storage device of claim 16, wherein the method is performed at a production performance level by satisfying at least one of the following performance level constraints:
   the obtained digital data represents activities ascribed collectively to at least ten customers of the service provider;
   the shared activity subset represents activities ascribed to each of at least five customers of the service provider; or
   the shared activity results in an indication of a past or current presence of a cybersecurity attack campaign against each of at least three customers of the service provider.

* * * * *